US008872770B2

(12) United States Patent
Matsunaga et al.

(10) Patent No.: US 8,872,770 B2
(45) Date of Patent: Oct. 28, 2014

(54) TERMINAL EMULATOR AND CONTROLLING METHOD THEREFOR

(75) Inventors: Akihiro Matsunaga, Shinagawa (JP);
Kenichi Fujita, Shinagawa (JP);
Shinichi Katayama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1715 days.

(21) Appl. No.: 12/219,631

(22) Filed: Jul. 24, 2008

(65) Prior Publication Data

US 2009/0027344 A1      Jan. 29, 2009

(30) Foreign Application Priority Data

Jul. 27, 2007   (JP) ................................ 2007-196752

(51) Int. Cl.
  *G09G 5/00*   (2006.01)
(52) U.S. Cl.
  USPC .......................................... 345/168; 345/156
(58) Field of Classification Search
  USPC .......... 345/1.1–5, 156, 168; 709/239; 710/62, 710/100
  See application file for complete search history.

(56) References Cited

U.S. PATENT DOCUMENTS

| 6,378,014 | B1 * | 4/2002 | Shirley ........................... 710/100 |
| 6,381,654 | B1 * | 4/2002 | Brawn et al. .................. 719/331 |
| 6,567,869 | B2 | 5/2003 | Shirley |
| 6,593,946 | B1 | 7/2003 | Yoda |
| 7,467,198 | B2 * | 12/2008 | Goodman et al. ............. 709/223 |
| 7,895,220 | B2 * | 2/2011 | Evans et al. .................... 707/756 |
| 2003/0144868 | A1 * | 7/2003 | MacIntyre et al. ................. 705/1 |
| 2006/0059253 | A1 * | 3/2006 | Goodman et al. ............. 709/223 |
| 2007/0047279 | A1 * | 3/2007 | Evans et al. ........................ 365/1 |
| 2008/0288306 | A1 * | 11/2008 | MacIntyre et al. ................. 705/7 |

FOREIGN PATENT DOCUMENTS

| CA | 2101035 | 3/1994 |
| JP | 02-206817 | 8/1990 |
| JP | 03-192455 | 8/1991 |
| JP | 06-208523 | 7/1994 |
| JP | 2000-020198 | 1/2000 |

OTHER PUBLICATIONS

Japanese Office Action issued on Aug. 9, 2011 in corresponding Japanese Patent Application No. 2007-196752.

* cited by examiner

*Primary Examiner* — Vijay Shankar
(74) *Attorney, Agent, or Firm* — Staas & Halsey LLP

(57) ABSTRACT

A terminal emulator 2 includes a memory 206, main controlling unit 202, data forming unit 203, and video data outputting unit 204. The memory 206 stores real-time data received from computer 1 as log data. The main controlling unit 202 sets real-time data display area and plural log data display areas arranged in display screen of monitor 4. The data forming unit 203 fits the real-time data and plural pieces of log data into the real-time data display area and the plural data display areas, and rearranges both of the real-time data and the plural pieces of log data in the form of a two-dimensional array. The video data outputting unit 204 converts the real-time data and the plural pieces of log data into the plural pieces of video data, and outputs the plural pieces of converted video data to the monitor 4.

21 Claims, 25 Drawing Sheets

FIG. 7A

| DATA ID (ONE BYTE) | DATA LENGTH (TWO BYTES) | REAL DATA |
|---|---|---|

FIG. 7B

DEFINITIONS OF DATA ID

0X01:RECEIVED DATA FROM COMPUTER 1
0X02:RECEIVED DATA FROM COMPUTER 5
0X04:RECEIVED DATA FROM COMPUTER 6
0X08:COLOR DESIGNATION 1
  OF DISPLAYED CHARACTERS
0X010:COLOR DESIGNATION 2
  OF DISPLAYED CHARACTERS
0X020:COLOR DESIGNATION 3
  OF DISPLAYED CHARACTERS
0X40:INSTRUCTION DATA

DATA ID = DATA CONTENTS IN CASE OF INSTRUCTION DATA
· REQUEST FOR SCROLL OPERATION OF " ↑ " OR " ↓ "
· FORMAT INFORMATION OF DATA ARRAY
· DESTINATION INFORMATION OF KEY DATA
· MEMORY INFORMATION OF DESTINATION TO STORE
· COLOR INFORMATION OF DISPLAYED CHARACTERS
· STYLE INFORMATION OF DISPLAYED CHARACTERS

MONITOR DISPLAY AREA

TERMINAL EMULATOR AND CONTROLLING METHOD THEREFOR

BACKGROUND OF THE INVENTION

1. Field of the Invention

The present invention relates to a terminal emulator connected between a computer and peripheral devices such as a mouse, a keyboard, and a monitor, as well as a controlling method therefore.

2. Description of the Related Art

Conventionally, there has been known a KVM (K:keyboard, V:video, M:mouse) switch including a terminal emulator which is connected between a plurality of computers and peripheral devices such as a mouse, a keyboard, and a monitor (see e.g. U.S. Pat. No. 6,567,869).

The KVM switch converts communication data output from a communication port (e.g. a serial port, a USB (Universal Serial Bus) port, or the like) of the selected computer into analog video data, and outputs the analog video data to the monitor. That is, the KVM switch can switch any one of pieces of communication data output from the plurality of computers to another one, and cause the monitor to display the another one of pieces of communication data as analog images.

Conventionally, there has been known a terminal emulator which is connected between a single computer and peripheral devices such as a mouse, a keyboard, and a monitor (see e.g. Japanese Patent Application Publication Nos. 3-192455 and 2-206817).

The terminal emulator in Japanese Patent Application Publication No. 3-192455 is connected to the single computer, causes the monitor to display two screens in different timings, and enables smooth processing of the job with a lot of changes of the screen. On the two screens, a present job screen and a next job screen transmitted from a job program are displayed.

The terminal emulator in Japanese Patent Application Publication No. 2-206817 is connected to the single computer, and causes the monitor to display two screens for the job, thereby enhancing operability of the computer. On the two screens for the job, job contents and help guidance are displayed.

However, since the terminal emulator in U.S. Pat. No. 6,567,869 switches any one of pieces of communication data output from the plurality of computers to another one, and cause the monitor to display the another one of pieces of communication data as analog images, a piece of communication data (i.e., real-time data) from a single computer is displayed on a screen of the monitor. The terminal emulator in Japanese Patent Application Publication No. 3-192455 displays the continuous pieces of real-time data (i.e., the plurality of pieces of data representing contents of present job and next job) from the single computer on the screen of the monitor.

The terminal emulator in Japanese Patent Application Publication No. 2-206817 displays real-time data (i.e., data representing contents of the job) and fixed data (i.e., help guidance) from the single computer on the screen of the monitor.

Therefore, in the above terminal emulators, a user cannot refer to the real-time data and the plurality of pieces of log data at the same time. Further, the user cannot refer to the plurality of pieces of the real-time data and selected log data at the same time.

SUMMARY OF THE INVENTION

It is an object of the present invention to provide a terminal emulator and a controlling method therefore capable of causing a user to refer to real-time data and a plurality of pieces of log data at the same time. It is another object of the present invention to provide a terminal emulator and a controlling method therefore capable of causing a user to refer to a plurality of pieces of real-time data and selected log data at the same time.

According to a first aspect of the present invention, there is provided a terminal emulator comprising: a connecting portion that is connectable between an information processing apparatus and a display device; a storing portion that stores real-time data received from the information processing apparatus as log data; a first setting portion that sets at least one real-time data display area displaying real-time data, and a plurality of log data display areas displaying a plurality of pieces of log data, the at least one real-time data display area and the plurality of log data display areas being arranged on a display screen of the display device; a data forming portion that fits the real-time data and the plurality of pieces of log data into the at least one real-time data display area and the plurality of log data display areas set by the first setting portion, respectively, and rearranges each of the real-time data and the plurality of pieces of log data in the form of a two-dimensional array; and an outputting portion that converts the rearranged real-time data and the plurality of pieces of rearranged log data into a plurality of pieces of video data, respectively, and outputs the plurality of pieces of video data to the display device.

With the above arrangement, it is capable of causing a user to refer to the real-time data and the plurality of pieces of log data at the same time. Specifically, when the plurality of pieces of log data which are important for the user are distributed, the user can refer to the plurality of pieces of log data at the same time.

Preferably, the terminal emulator further comprises a date-and-time adding portion that adds date and time to the real-time data which is stored into the storing portion as the log data, and a second setting portion that sets which of the plurality of log data display areas the log data is displayed on, based on the date and time added to the log data.

With the above arrangement, since the log data display area on which each of the plurality of pieces of log data is displayed is decided by the date and time added to the log data, the user becomes easy to reach and confirm desired log data.

Preferably, the storing portion has a list in which any character string included in the real-time data is preset, the first setting portion sets a first log data display area and an important log data display area as the plurality of log data display areas, the terminal emulator further comprises a determining portion that determines whether the any character string set in the list is included in real-time data received from the information processing apparatus, and an identification data adding portion that adds identification data to a data line of the real-time data including the any character string when it is determined that the any character string is included in the real-time data, the storing portion stores the real-time data to which the identification data is added, as the log data, and the log data is displayed on the important log data display area.

With the above arrangement, the log data including any character string from all log data is automatically displayed, so that it becomes easy to confirm the log data including any character string.

More preferably, the identification data adding portion adds the identification data to the data line of the real-time data including the any character string and data lines before and behind the data line.

With the above arrangement, it becomes easy to confirm the log data including any character string when any character string extends over a plurality of lines.

Preferably, the connecting portion connects an inputting device that executes data input to any one of the real-time data display area and the plurality of log data display areas thereto, and the terminal emulator further comprises a first switching portion that switches any one of the real-time data display area and the plurality of log data display areas to be a display area of an active state where data input from the inputting device becomes effective, based on given data input from the inputting device.

With the above arrangement, the user can execute data input to any one of the real-time data display area and the plurality of log data display areas.

More preferably, the color and the style of displayed characters in the display area of the active state are switched from the color and the style of the displayed characters in the display area of an inactive state.

With the above arrangement, the user can determines which display area is in the active state by viewing the color and the style of the displayed characters.

Preferably, the real-time data display area and the plurality of log data display areas are displayed so as to divide the display screen of the display device into an up side and a down side or a right side and a left side.

With the above arrangement, the user can arrange the real-time data display area and the plurality of log data display areas in up and down or right and left, and refer to their areas at the same time.

More preferably, the terminal emulator further comprises a second switching portion that switches a divisional type of the real-time data display area and the plurality of log data display areas.

With the above arrangement, the divisional type of the real-time data display area and the plurality of log data display areas (i.e., up and down or right and left) can be switched depending on a user's preference.

Preferably, the terminal emulator further comprises a second connecting portion that connects an external storage thereto, wherein the log data is stored into the external storage.

With the above arrangement, it is possible to store and carry high-capacity log data, and to confirm log data which exceeds the capacity of the storing portion.

More preferably, the terminal emulator further comprises a third switching portion that switches a destination of storing of the log data to any one of the storing portion and the external storage.

With the above arrangement, it is possible to switch the destination of the log data depending on a user's demand.

According to a second aspect of the present invention, there is provided a terminal emulator comprising: a connecting portion that is connectable between a plurality of information processing apparatuses and a display device; a storing portion that stores a plurality of pieces of real-time data received from the plurality of information processing apparatuses as a plurality of pieces of log data; a selecting portion that selects log data displayed on a log data display area in a display screen of the display device from the plurality of pieces of log data; a data forming portion that fits the plurality of pieces of real-time data and the selected log data into a plurality of real-time data display areas and the log data display area, respectively, and rearranges each of the plurality of pieces of the real-time data and the log data in the form of a two-dimensional array, the plurality of real-time data display areas and the log data display area being displayed on a display screen of the display device; and an outputting portion that converts the plurality of pieces of rearranged real-time data and the rearranged log data into a plurality of pieces of video data, respectively, and outputs the plurality of pieces of video data to the display device.

With the above arrangement, it is capable of causing a user to refer to a plurality of pieces of real-time data and the selected log data at the same time.

Preferably, the terminal emulator further comprises a dividing portion that divides the log data display area into a plurality of data display areas.

With the above arrangement, it is capable of causing the user to refer to the plurality of pieces of log data and the plurality of pieces of real-time data at the same time. When the plurality of pieces of log data which are stored into an information processing apparatus and are important for the user are distributed, the user can refer to the plurality of pieces of log data at the same time. Further, the user can refer to the plurality of pieces of log data stored into the plurality of information processing apparatuses.

More preferably, the terminal emulator further comprises a date-and-time adding portion that adds date and time to the plurality of pieces of real-time data which are stored into the storing portion as the plurality of pieces of log data, and a setting portion that sets which of the plurality of divided data display areas each of the plurality of pieces of log data is displayed on, based on the date and time added to each of the plurality of pieces of log data.

With the above arrangement, since the data display area on which each of the plurality of pieces of log data is displayed is decided by the date and time added to the log data, the user becomes easy to reach and confirm desired log data.

More preferably, the storing portion has a list in which any character string included in the plurality of pieces of real-time data is preset, the dividing portion divides the log data display area into a first log data display area and an important log data display area, the terminal emulator further comprises a determining portion that determines whether the any character string set in the list is included in real-time data received from each of the information processing apparatuses, and an identification data adding portion that adds identification data to a data line of the real-time data including the any character string when it is determined that the any character string is included in the real-time data, the storing portion stores the real-time data to which the identification data is added, as the log data, and the log data is displayed on the important log data display area.

With the above arrangement, the log data including any character string from all log data is automatically displayed, so that it becomes easy to confirm the log data including any character string.

Still more preferably, the identification data adding portion adds the identification data to the data line of the real-time data including the any character string and data lines before and behind the data line.

With the above arrangement, it becomes easy to confirm the log data including any character string when any character string extends over a plurality of lines.

Preferably, the connecting portion connects an inputting device that executes data input to any one of the plurality of real-time data display areas and the log data display area thereto, and the terminal emulator further comprises a first switching portion that switches any one of the plurality of real-time data display areas and the log data display area to be a display area of an active state where data input from the inputting device becomes effective, based on given data input from the inputting device.

With the above arrangement, the user can execute data input to any one of the real-time data display area and the plurality of log data display areas.

More preferably, the color and the style of displayed characters in the display area of the active state are switched from the color and the style of the displayed characters in the display area of a nonactive state.

With the above arrangement, the user can determines which display area is in the active state by viewing the color and the style of the displayed characters.

Preferably, the terminal emulator further comprises a second connecting portion that connects an external storage thereto, wherein the plurality of pieces of log data are stored into the external storage.

With the above arrangement, it is possible to store and carry high-capacity log data, and to confirm log data which exceeds the capacity of the storing portion.

More preferably, the terminal emulator further comprises a second switching portion that switches a destination of storing of the plurality of pieces of log data to any one of the storing portion and the external storage.

With the above arrangement, it is possible to switch the destination of the log data depending on a user's demand.

According to a third aspect of the present invention, there is provided a controlling method for a terminal emulator which is connected between an information processing apparatus and a display device, comprising: a storing step of storing real-time data received from the information processing apparatus as log data into a memory; a data forming step of fitting real-time data and log data into a real-time data display area and a log data display areas, respectively, and rearranging each of the real-time data and the log data in the form of a two-dimensional array, the real-time data display area and the log data display area being displayed on a display screen of the display device; an outputting step of converting the rearranged real-time data and the rearranged log data into a plurality of pieces of video data, respectively, and outputting the plurality of pieces of video data to the display device; and a setting step of setting the number and the position of real-time data display areas and log data display areas arranged in the display screen of the display device; wherein the setting step sets the real-time data display area and a plurality of log data display areas.

With the above arrangement, it is capable of causing a user to refer to the real-time data and the plurality of pieces of log data at the same time.

According to a fourth aspect of the present invention, there is provided a controlling method for a terminal emulator which is connected between a plurality of information processing apparatuses and a display device, comprising: a storing step of storing a plurality of pieces of real-time data received from the plurality of information processing apparatuses as a plurality of pieces of log data into a memory; a selecting step of selecting log data displayed on a log data display area in a display screen of the display device from the plurality of pieces of log data; a data forming step of fitting the plurality of pieces of real-time data and the selected log data into a plurality of real-time data display areas and the log data display area, respectively, and rearranging each of the plurality of pieces of the real-time data and the log data in the form of a two-dimensional array, the plurality of real-time data display areas and the log data display area being displayed on a display screen of the display device; and an outputting step of converting the plurality of pieces of rearranged real-time data and the rearranged log data into a plurality of pieces of video data, respectively, and outputting the plurality of pieces of video data to the display device.

With the above arrangement, it is capable of causing a user to refer to a plurality of pieces of real-time data and the selected log data at the same time.

BRIEF DESCRIPTION OF THE DRAWINGS

Preferred embodiments of the present invention will be described in detail with reference to the following drawings, wherein:

FIG. 7A is a diagram showing the data structure of instruction data transmitted from a main controlling unit 202 to a data forming unit 203;

FIG. 7B is a diagram showing an example of definitions of data ID;

DESCRIPTION OF THE PREFERRED EMBODIMENTS

A description will now be given, with reference to the accompanying drawings, of an embodiment of the present invention.

(First Embodiment)

Figure 1:
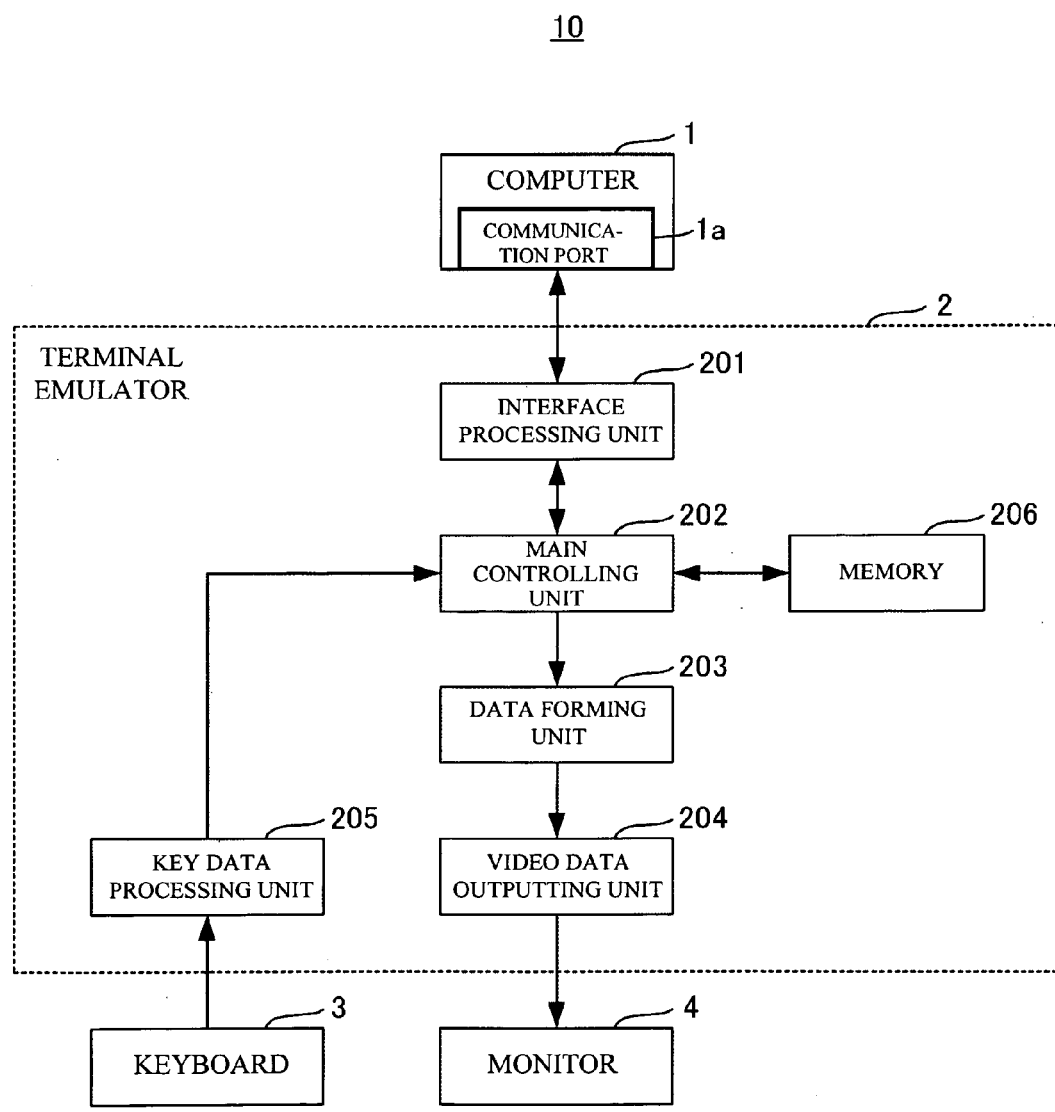
FIG. 1 is a block diagram showing the construction of a data processing system including a terminal emulator according to a first embodiment of the present invention.

FIG. 1 is a block diagram showing the construction of a data processing system including a terminal emulator according to a first embodiment of the present invention.

Figure 2A:
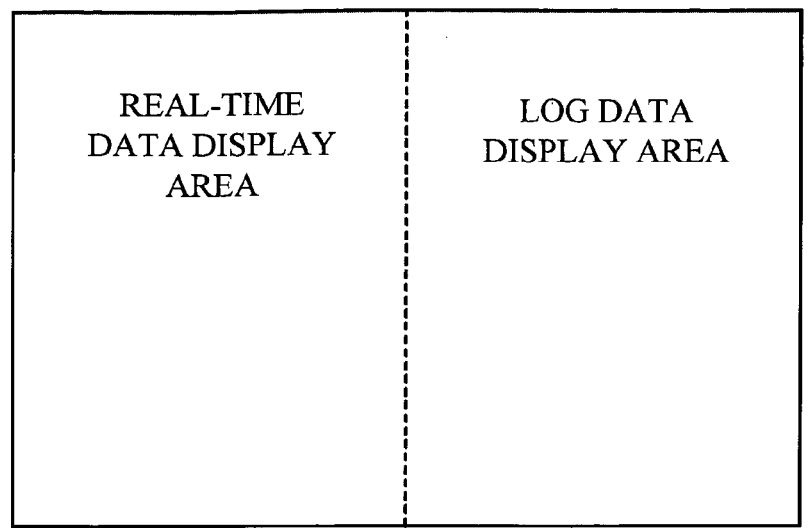
FIG. 2A is a diagram showing an example of a monitor display area in the case where a real-time data display area and a log data display area are displayed rightward and leftward.
Figure 2B:
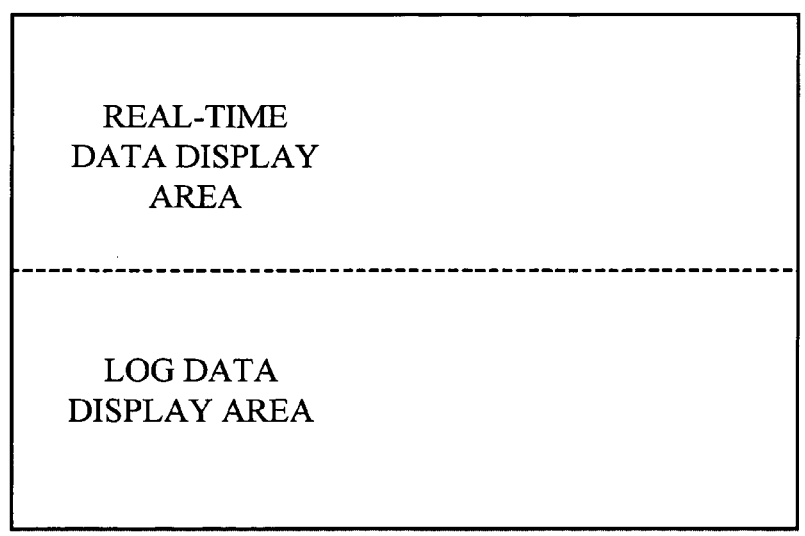
FIG. 2B is a diagram showing an example of a monitor display area in the case where a real-time data display area and a log data display area are displayed upward and downward.

In FIG. 1, a data processing system 10 is provided with a computer 1 including a communication port 1a which is composed of a serial port, a USB (Universal Serial Bus) port, or the like, a terminal emulator 2, a keyboard 3, and a monitor 4 which is composed of a liquid crystal or a CRT. As shown in FIGS. 2A and 2B, a display area of the monitor 4 (hereafter referred to as "a monitor display area") includes a real-time data display area that displays serial data received in real-time from the computer 1 by the terminal emulator 2, and a log data display area that displays serial data stored into the terminal emulator 2 as log data.

The terminal emulator 2 is connected to the communication port 1a of the computer 1, the keyboard 3, and the monitor 4. Further, a mouse, not shown, may be connected to the terminal emulator 2.

The terminal emulator 2 has an interface processing unit 201 (a connecting portion), a main controlling unit 202 (a date-and-time adding portion), a data forming unit 203 (a data forming portion), a video data outputting unit 204 (a connecting portion, a outputting portion), a key data processing unit 205 (a connecting portion), and a memory 206 (a storing portion). The main controlling unit 202 is connected to the interface processing unit 201, the data forming unit 203, the key data processing unit 205, and the memory 206. The interface processing unit 201 is connected to the communication port 1a of the computer 1. The key data processing unit 205 is connected to the keyboard 3, and the video data outputting unit 204 is connected to the data forming unit 203 and the monitor 4.

The interface processing unit 201 has a serial port, a USB (Universal Serial Bus) port, or the like, and receives serial data (real-time data) from the computer 1. The received serial data is transmitted to the main controlling unit 202. The interface processing unit 201 transmits key data received from the main controlling unit 202 to the computer 1.

The main controlling unit 202 is composed of a CPU, a ROM, a RAM, or the like, stores the serial data (real-time data) from the interface processing unit 201 into the memory 206, and then transmits the serial data to the data forming unit 203. When the real-time data display area is in an active state, the main controlling unit 202 transmits the key data received from the key data processing unit 205 to the interface processing unit 201.

When the main controlling unit 202 receives information indicative of a preset hot key from the key data processing unit 205, the main controlling unit 202 switches the active states of the real-time data display area and the log data display area.

Further, when the log data display area is in the active state, and the main controlling unit 202 receives the key data indicative of depression of a "↑" key or a "↓" key from the key data processing unit 205, the main controlling unit 202 transmits instruction data to scroll operation to the data forming unit 203.

When the main controlling unit 202 receives information indicative of a preset hot key from the key data processing unit 205, the main controlling unit 202 transmits instruction data for changing an arrow setting (up and down, or right and left) formed by the data forming unit 203 to the data forming unit 203.

The main controlling unit 202 sets the number and the positions of real-time data display areas and log data display areas arranged in the monitor display area on one screen, based on input from the keyboard 3 (a first setting portion).

The data forming unit 203 is composed of a CPU, a ROM, a RAM, or the like, rearranges the serial data (i.e., the real-time data or the log data) received from the main controlling unit 202 in the form of the two-dimensional array such that the serial data fits into the monitor display area. The serial data formed in the form of the two-dimensional array is called array data.

The data forming unit 203 receives instruction data from the main controlling unit 202, acquires the serial data (log data) corresponding to scroll operation from the memory 206, and forms the array data.

The video data outputting unit 204 is composed of an image processing circuit including a D/A converter, and a monitor port, converts the array data formed by the data forming unit 203 into video data at constant time intervals, and outputs the video data.

The key data processing unit 205 is composed of a port for connecting the keyboard 3, and transmits the key data input from the keyboard 3 to the main controlling unit 202.

The memory 206 is composed of a nonvolatile memory, a hard disk drive, or the like, receives and stores the serial data (real-time data) from the main controlling unit 202.

Figure 3:
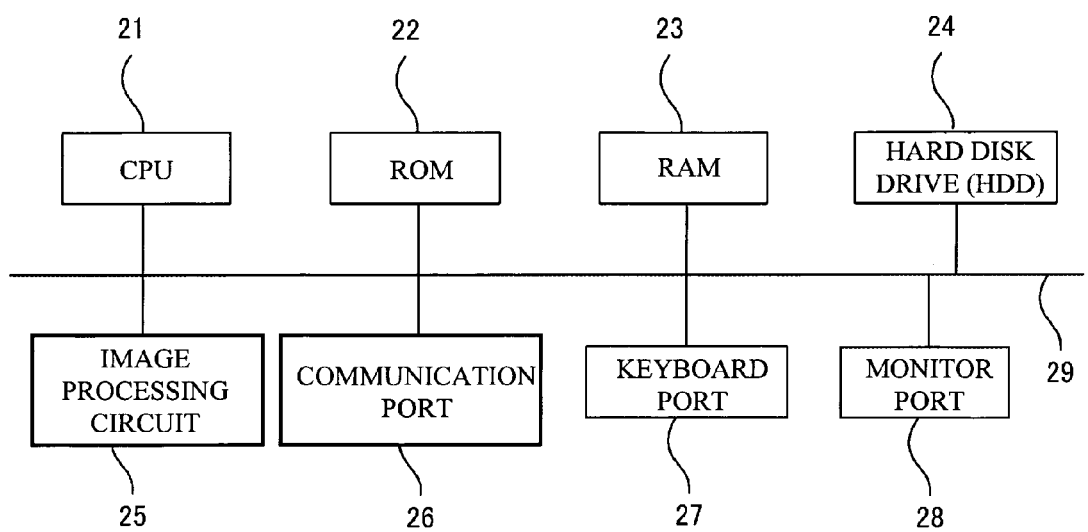
FIG. 3 is a block diagram showing the hardware structure of a terminal emulator 2.

FIG. 3 is a block diagram showing the hardware structure of the terminal emulator 2.

The terminal emulator 2 has a CPU 21 that controls the entire device, a ROM 22 that stores control programs, a RAM 23 that functions as a working area, a hard disk drive (HDD) 24 that stores the serial data, various kinds of information and programs, an image processing circuit 25 that converts the serial data into the video data, a communication port 26 that is composed of a serial port and a USB port for connecting the computer 1 thereto, a keyboard port 27 for connecting the keyboard 3 thereto, and a monitor port 28 for connecting the monitor 4 thereto. The CPU 21 is connected to the ROM 22, the RAM 23, the hard disk drive (HDD) 24, the image processing circuit 25, the communication port 26, the keyboard port 27, and the monitor port 28 via a system bus 29.

The interface processing unit 201 in FIG. 1 corresponds to the communication port 26. The main controlling unit 202 and the data forming unit 203 correspond to the CPU 21 executing various processes according to the control programs. The key data processing unit 205 corresponds to the keyboard port 27, and the video data outputting unit 204 corresponds to the image processing circuit 25 and the monitor port 28. The memory 206 corresponds to the HDD 24.

Figure 4:
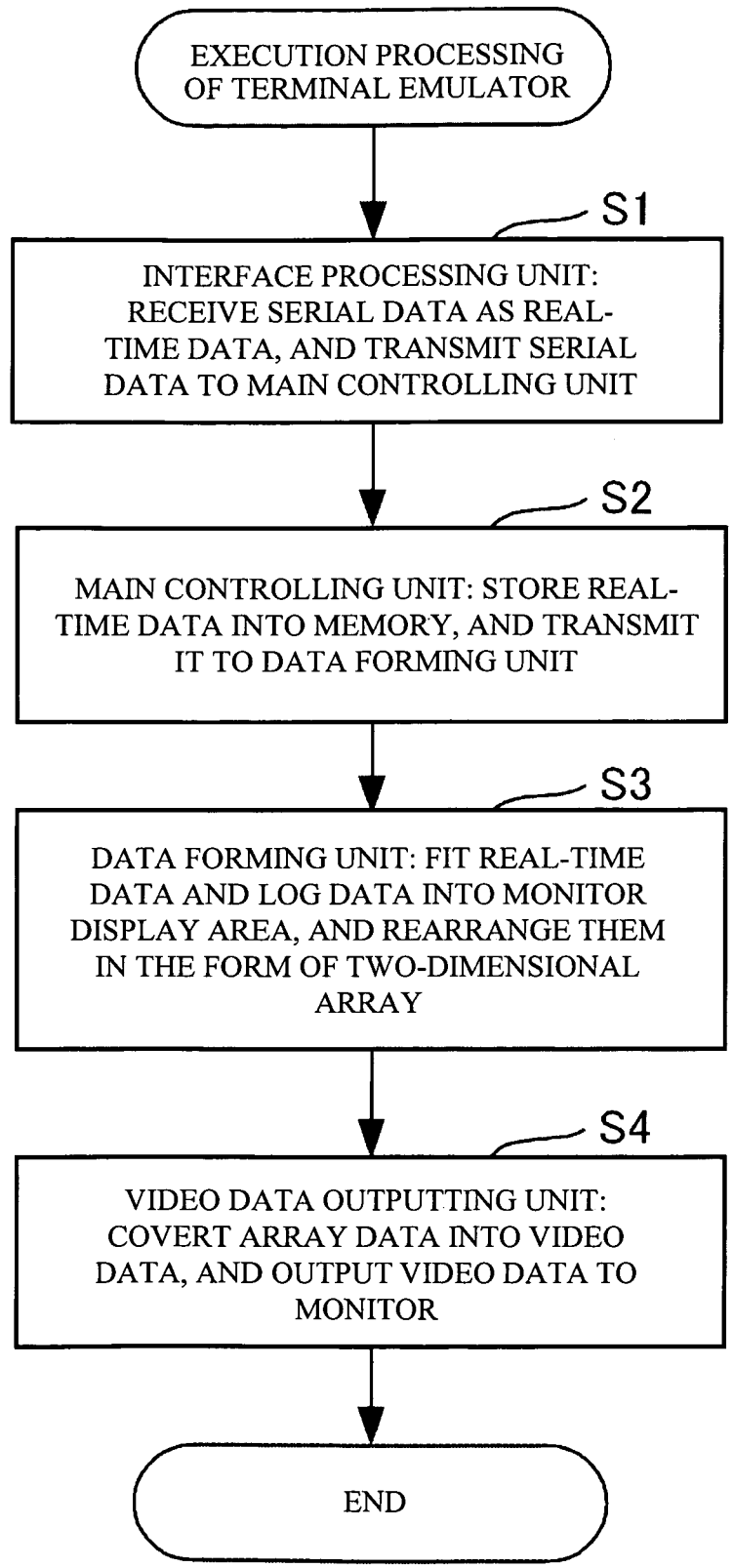
FIG. 4 is a flowchart showing execution processing of the terminal emulator 2 from the reception of serial data to the generation of video data.

FIG. 4 is a flowchart showing execution processing of the terminal emulator 2 from the reception of the serial data to the generation of the video data.

First, the interface processing unit 201 receives the serial data as the real-time data from the computer 1, and transmits the serial data to the main controlling unit 202 (step S1).

The main controlling unit 202 stores the received serial data into the memory 206, and transmits the received serial data to the data forming unit 203 (step S2).

The data forming unit 203 causes the serial data received from the main controlling unit 202 and the log data in the memory 206 to fit into the monitor display area, and rearranges the serial data and the log data in the form of the two-dimensional array, i.e., forms a plurality of pieces of array data (step S3).

The video data outputting unit 204 coverts the plurality of pieces of array data formed by the data forming unit 203 into a plurality of pieces of video data, and outputs the plurality of pieces of video data to the monitor 4 (step S4). The procedure is terminated.

Figure 5:
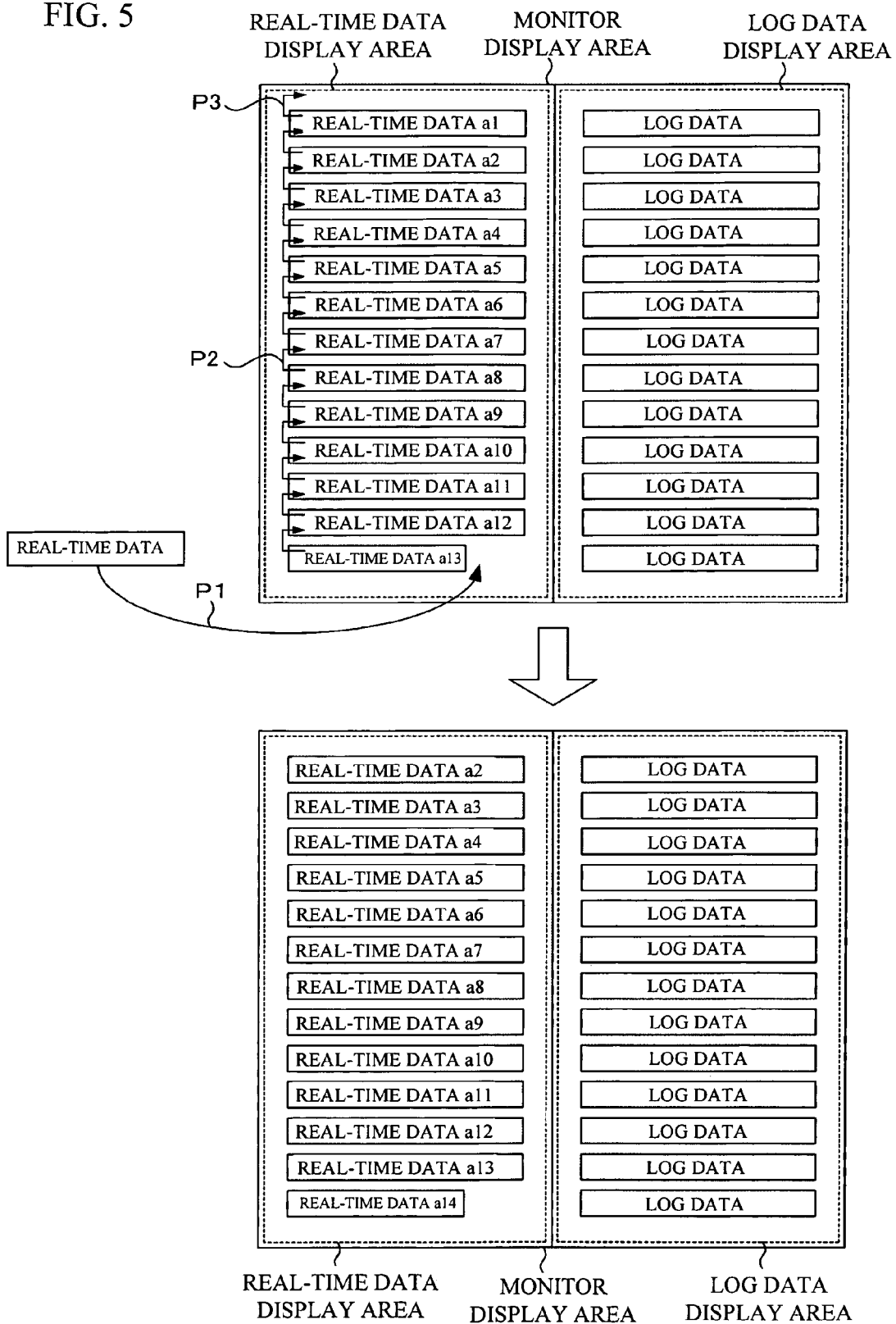
FIG. 5 is a diagram showing a method to form array data in a form that divides the monitor display area into a right side and a left side.

FIG. 5 is a diagram showing a method to form the array data in a form that divides the monitor display area into right and left.

The data forming unit 203 arranges the received serial data at the undermost line of the real-time data display area (P1). When the number of characters displayed on the undermost line exceeds a specified value, or a line feed code is received, the data forming unit 203 moves lines displayed on the real-time data display area upward by one line (P2). The data forming unit 203 deletes an uppermost line from the array data (P3). The data forming unit 203 updates displayed contents of the real-time data display area by repeating the procedures of the P1 to P3.

Figure 6:
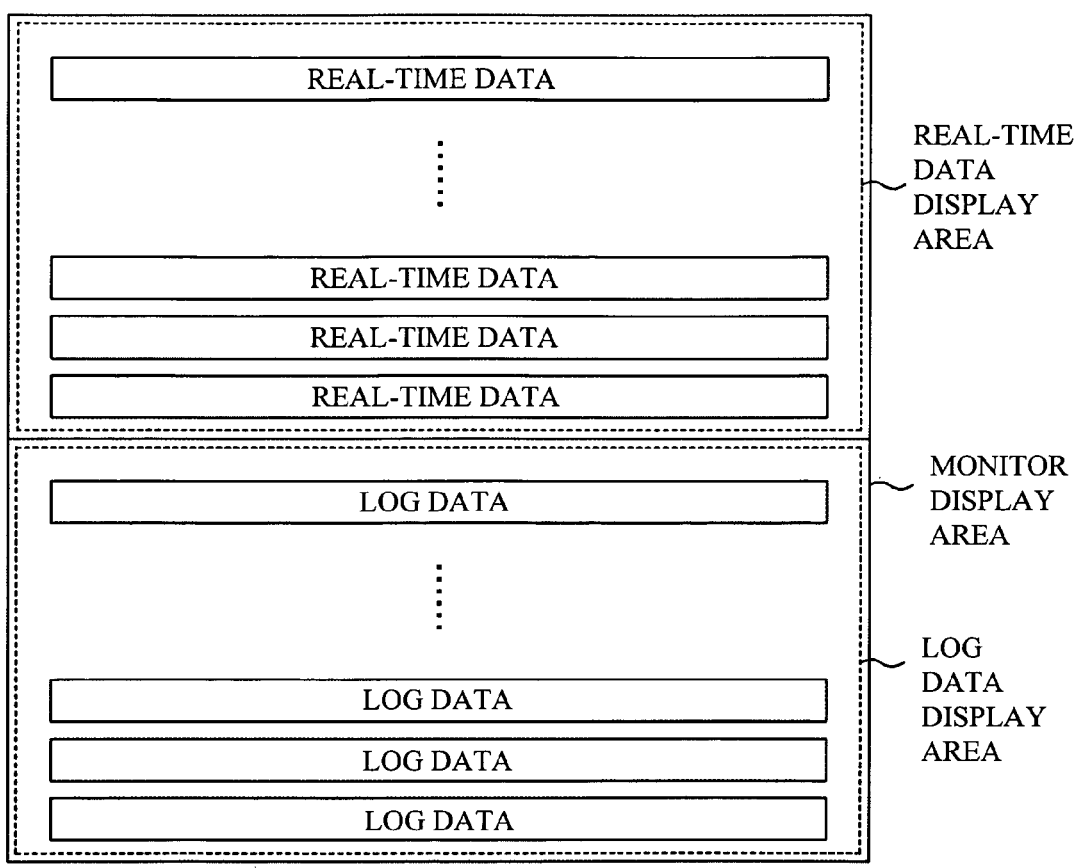
FIG. 6 is a diagram showing an example to form array data in a form that divides the monitor display area into an up side and a down side.

The data forming unit 203 may form the array data in a form that divides the monitor display area into an up side and a down side as shown in FIG. 6, in addition to the array data in a form that divides the monitor display area into a right side and a left side as shown in FIG. 5. A display format of the monitor display area in FIGS. 5 and 6 can be switched each other.

When the main controlling unit 202 detects preset hot key input from the keyboard 3, the instruction data including format information of the array data (see FIGS. 7A and 7B) is transmitted to the data forming unit 203. Then, the data forming unit 203 changes a format of the array data. Therefore, the display format of the monitor display area can be switched. That is, the display format divided into the up side and the down side is switched to the display format divided into the right side and the left side, or the display format divided into the up side and the down side is switched to the display format divided into the up side and the down side.

The main controlling unit 202 (a first switching portion) can switch any one of the real-time data display area and the log data display area to a display area in a state where the key input from the keyboard 3 becomes effective (hereinafter referred to as "an active state"). Therefore, the user can input data to each of the real-time data display area and the log data display area.

With respect to the color and the style of displayed characters, when the main controlling unit 202 receives information of the hot key that makes any one of the display areas the active state, the main controlling unit 202 transmits the instruction data (see FIGS. 7A and 7B) to the data forming unit 203. The data forming unit 203 (a second switching portion) switches from the color (e.g. black) and the style of the displayed characters in the array data of the display area of the nonactive state to the color (e.g. red) and the style of the displayed characters in the array data of the display area of the active state, according to the instruction data. The style of the displayed characters includes the thickness of each character, a font, the size of each character, or the like, for example.

Thus, the determination that which display area is the active state is possible by the color and the style of the displayed characters.

FIG. 7A is a diagram showing the data structure of instruction data transmitted from the main controlling unit 202 to the data forming unit 203, and FIG. 7B is a diagram showing an example of definitions of data ID.

The instruction data includes data ID of one byte, data length of two bytes, and real data. When the data ID is "0×40", any of data contents shown in a right column of FIG. 7B is included in the real data.

Figure 8:
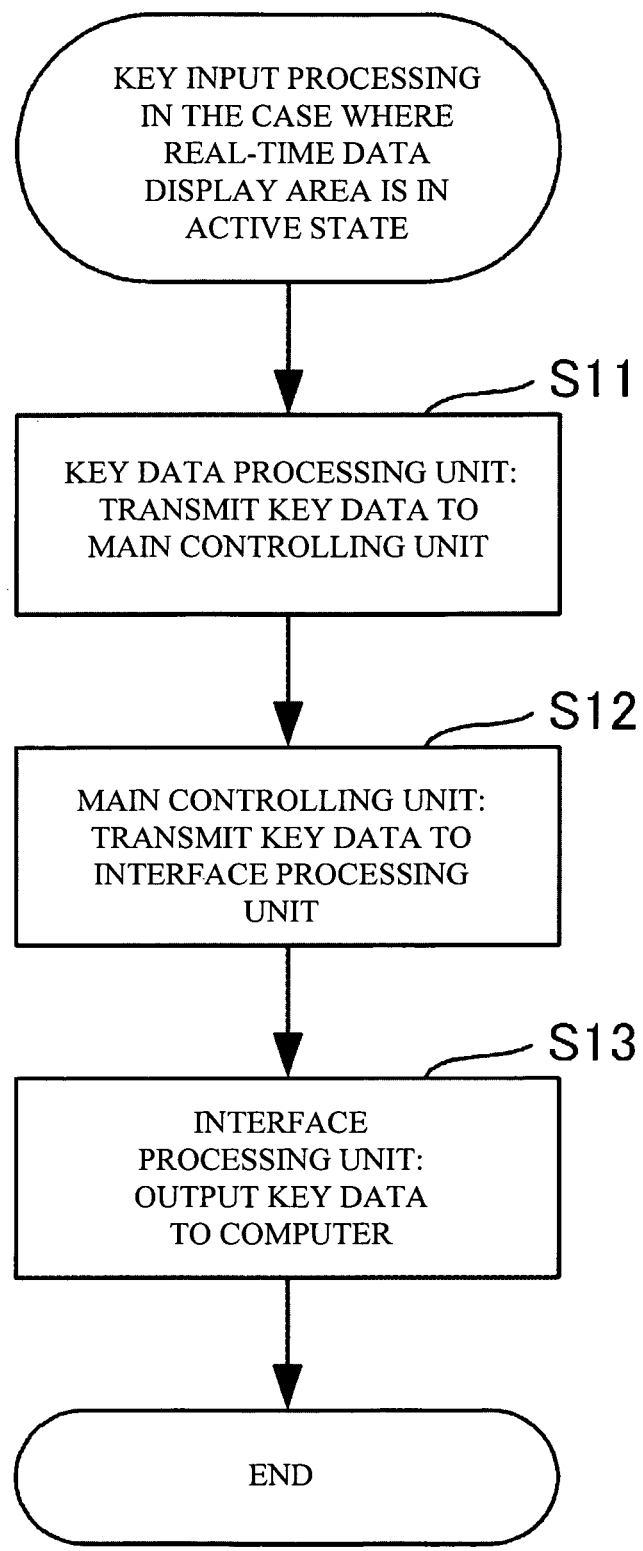
FIG. 8 is a flowchart showing key input processing in the case where the real-time data display area is in an active state.

FIG. 8 is a flowchart showing key input processing in the case where the real-time data display area is in the active state.

When the real-time data display area is in the active state, the key input from the keyboard 3 becomes effective for the computer 1.

The key data processing unit 205 of the terminal emulator 2 transmits the key data received from the keyboard 3 to the main controlling unit 202 (step S11). The main controlling unit 202 transmits the received key data to the interface processing unit 201 (step S12). The interface processing unit 201 outputs the received key data to the computer 1 (step S13). The procedure is terminated.

Figure 9:
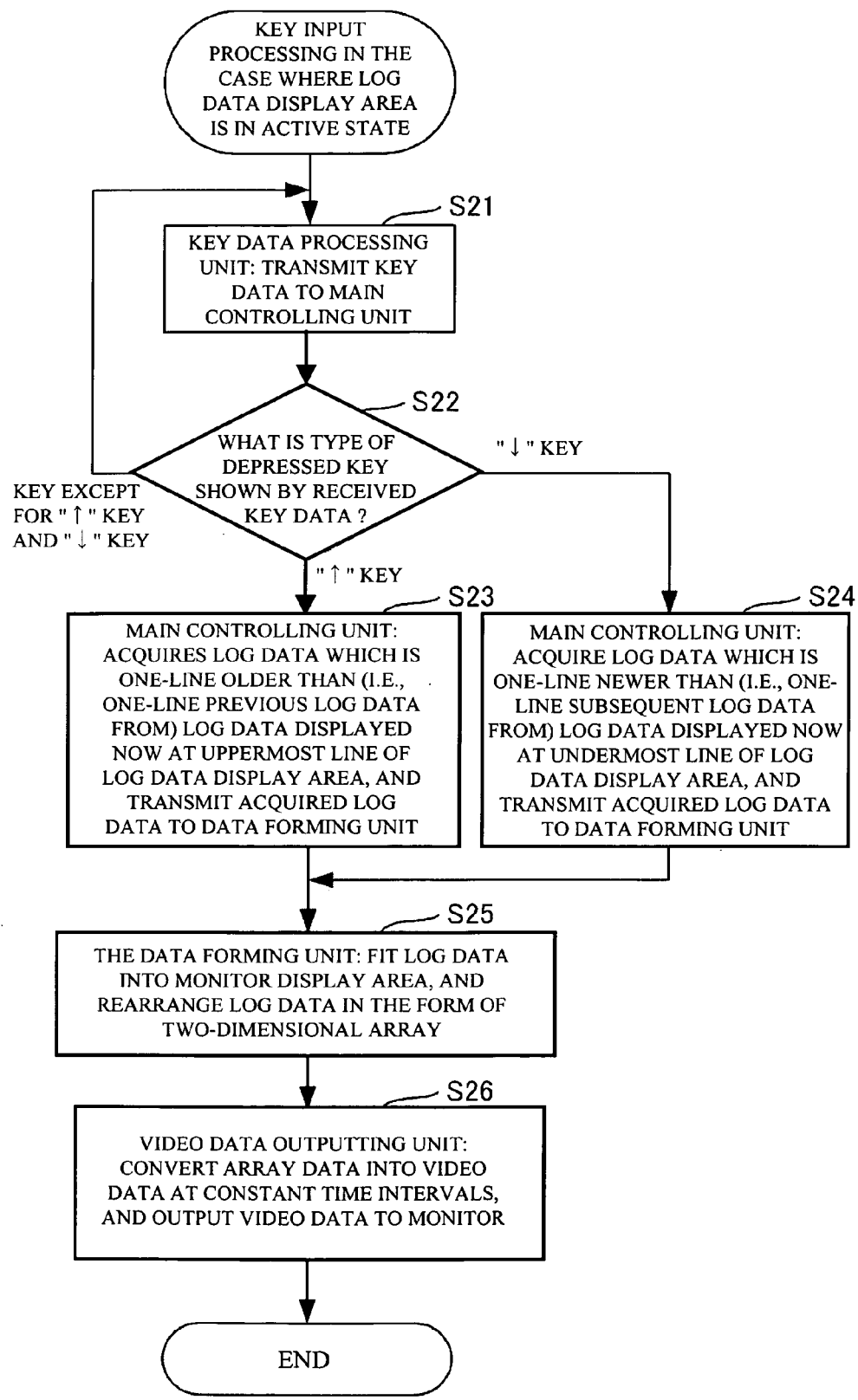
FIG. 9 is a flowchart showing key input processing in the case where the log data display area is in an active state.

FIG. 9 is a flowchart showing key input processing in the case where the log data display area is in the active state.

When the log data display area is in the active state, the user can make the log data display area scroll by the "↑" key or the "↓" key of the keyboard 3, and can confirm the log data in the memory 206.

First, the key data processing unit 205 of the terminal emulator 2 transmits the key data received from the keyboard 3 to the main controlling unit 202 (step S21). The main controlling unit 202 distinguishes the type of depressed key shown by the received key data (step S22).

In step S22, when the type of the depressed key is a key other than the "↑" key and the "↓" key, the main controlling unit 202 ignores the key data, and the procedure returns to step S21. That is, the procedure returns to a state to wait for the key input.

In step S22, when the type of the depressed key is the "↑" key, the main controlling unit 202 acquires log data which is one-line older than (i.e., one-line previous log data from) the log data displayed now at the uppermost line of the log data display area, from the memory 206, and transmits the acquired log data to the data forming unit 203 (step S23).

The data forming unit 203 causes the log data received from the main controlling unit 202 to fit into the monitor display area, and rearranges the log data in the form of the two-dimensional array, i.e., forms the array data (step S25). The video data outputting unit 204 converts the array data formed by the data forming unit 203 into the video data at constant time intervals, and outputs the video data to the monitor 4 (step S26). The procedure is terminated.

Figure 10:
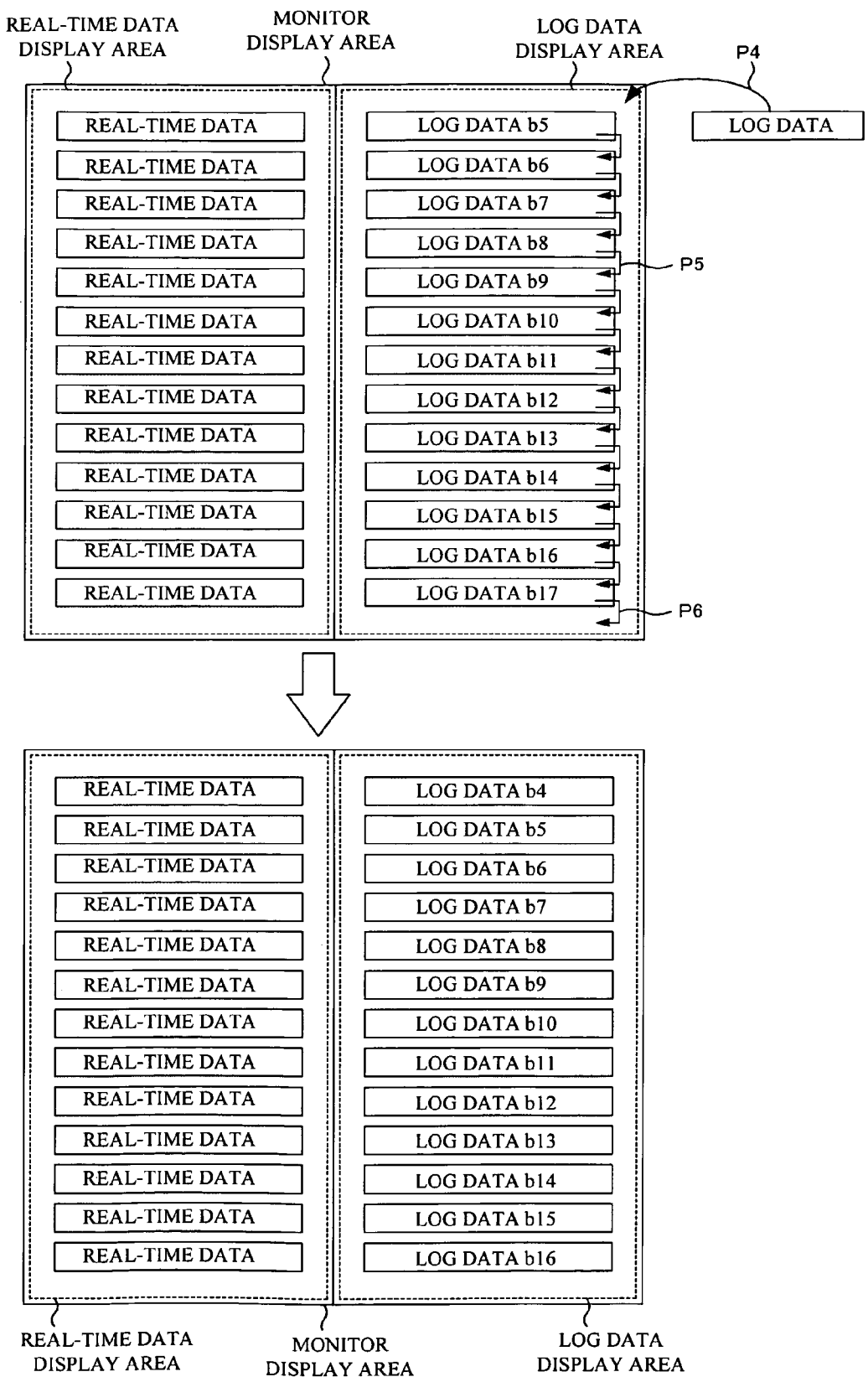
FIG. 10 is a diagram showing a method to form array data in the case where the log data display area is in the active state and a "↑" key is depressed.

FIG. 10 is a diagram showing a method to form the array data in the case where the log data display area is in the active state and the "↑" key is depressed.

The data forming unit 203 acquires the log data which is one-line older than (i.e., one-line previous log data from) the log data displayed now at the uppermost line of the log data display area, from the memory 206 via the main controlling unit 202, and arranges the acquired log data at the uppermost line of the log data display area (P4). The data forming unit 203 moves lines currently displayed on the log data display area downward by one line (P5). The data forming unit 203 deletes the undermost line from the array data (P6). The data forming unit 203 updates displayed contents of the log data display area by repeating the procedures of the P4 to P6.

Returning to FIG. 9, in step S22, when the type of the depressed key is the "↓" key, the main controlling unit 202 acquires the log data which is one-line newer than (i.e., one-line subsequent log data from) the log data displayed now at the undermost line of the log data display area, from the memory 206, and transmits the acquired log data to the data forming unit 203 (step S24). Then, the procedure proceeds to step S25.

Figure 11:
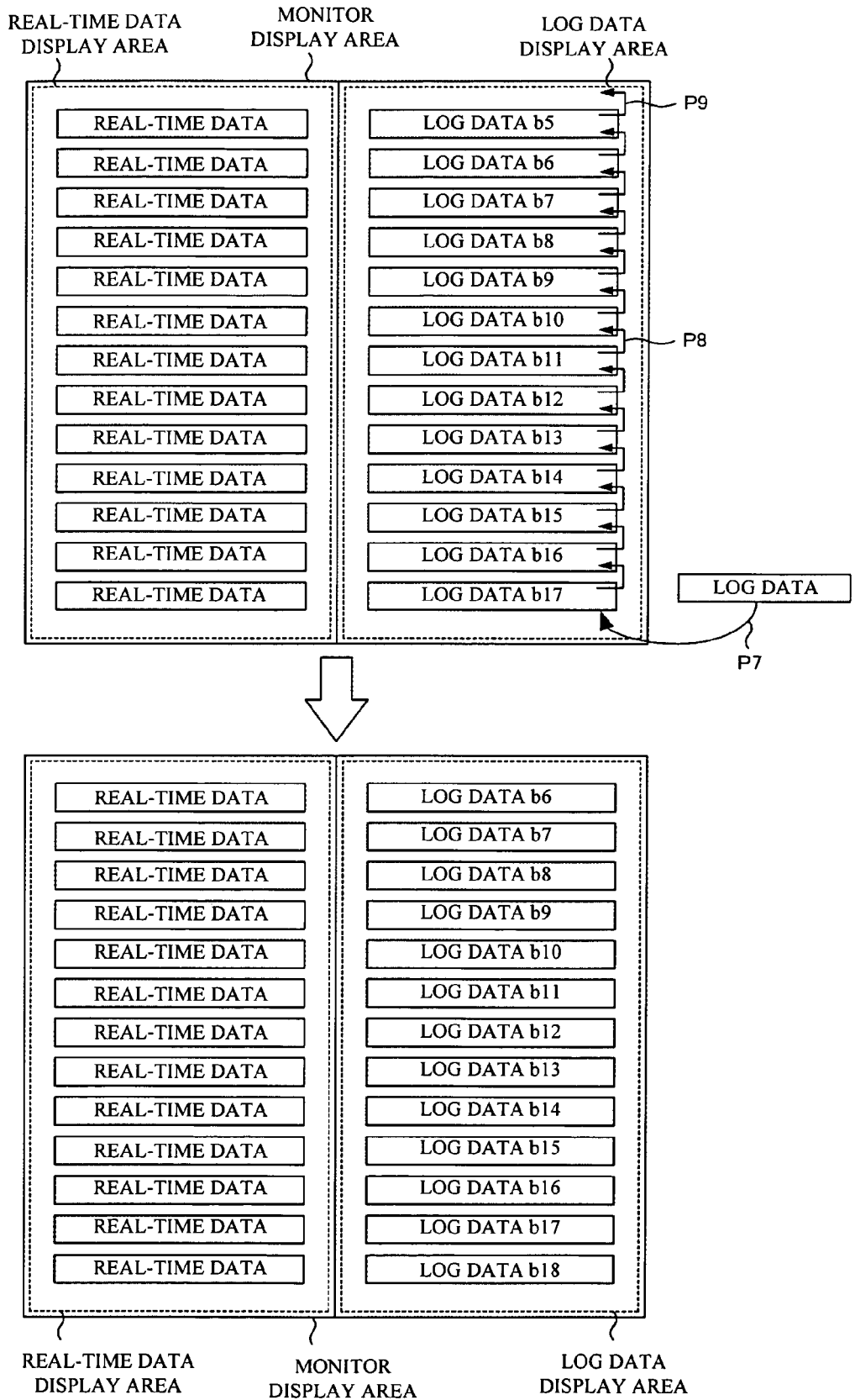
FIG. 11 is a diagram showing a method to form array data in the case where the log data display area is in the active state and a "↓" key is depressed.

FIG. 11 is a diagram showing a method to form the array data in the case where the log data display area is in the active state and the "↓" key is depressed.

The data forming unit 203 acquires the log data which is one-line newer than (i.e., one-line subsequent log data from) the log data displayed now at the undermost line of the log data display area, from the memory 206 via the main controlling unit 202, and arranges the acquired log data at the undermost line of the log data display area (P7). The data forming unit 203 moves lines currently displayed on the log data display area upward by one line (P8). The data forming unit 203 deletes the uppermost line from the array data (P9). The data forming unit 203 updates displayed contents of the log data display area by repeating the procedures of the P7 to P9.

When the terminal emulator executes initial operation, nothing is displayed on the log data display area and the real-time data display area, and the array data is formed every time the data forming unit 203 receives the log data and the real-time data.

A description will now be given of an example that divides the serial data from the computer 1 into three or more, and displays three or more display areas including the divided serial data.

Figure 12:
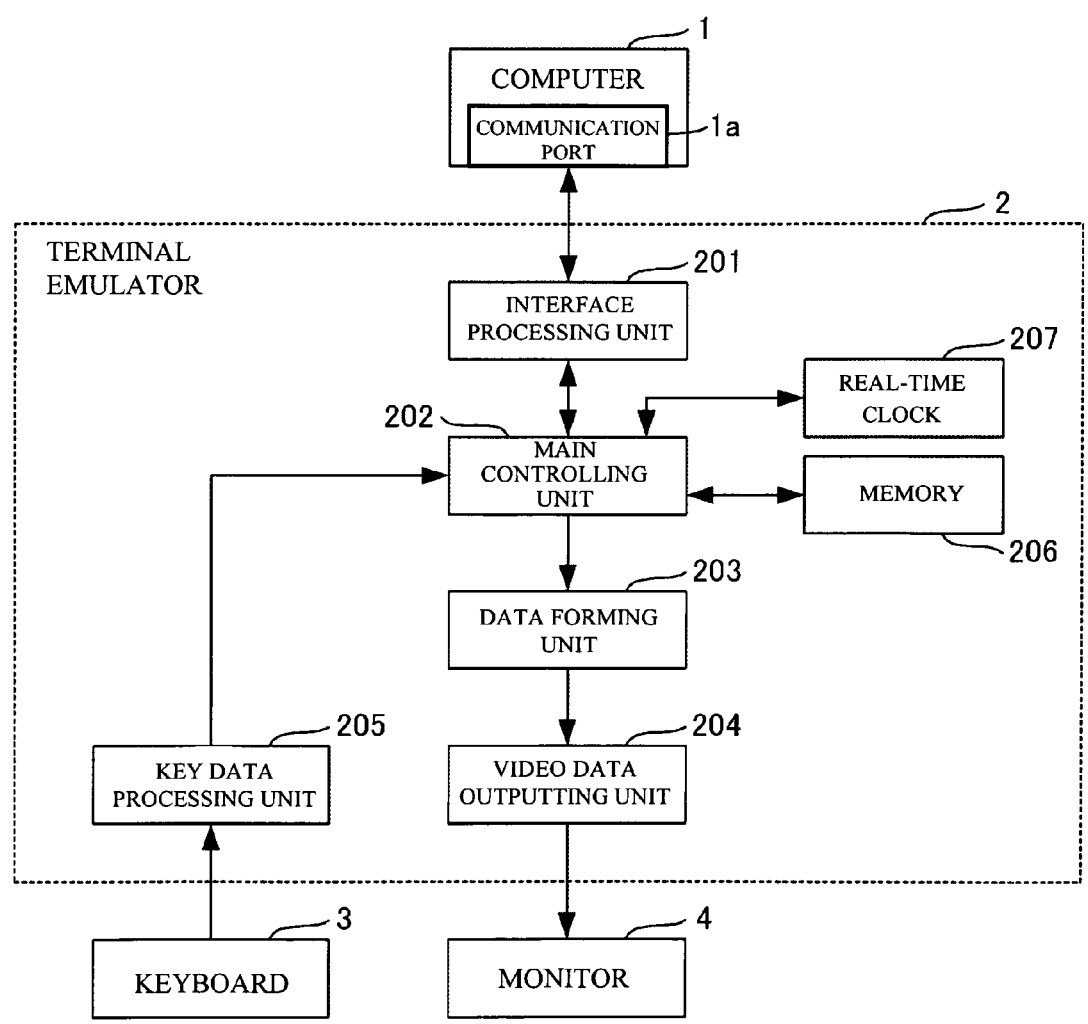
FIG. 12 is a block diagram showing a variation of the construction of the data processing system in FIG. 1.

FIG. 12 is a block diagram showing a variation of the construction of the data processing system in FIG. 1.

A data processing system 11 in FIG. 12 is different from the data processing system 10 in that the terminal emulator 2 includes a real-time clock 207 (a date-and-time adding portion) which measures date and time.

The main controlling unit 202 (a date-and-time adding portion) is connected to the real-time clock 207, acquires date and time from the real-time clock 207, adds a time stamp to the serial data output from the computer 1, and stores the serial data with the time stamp into the memory 206. It should be noted that the time stamp may or may not be added to the serial data transmitted from the main controlling unit 202 to the data forming unit 203.

Figure 13:
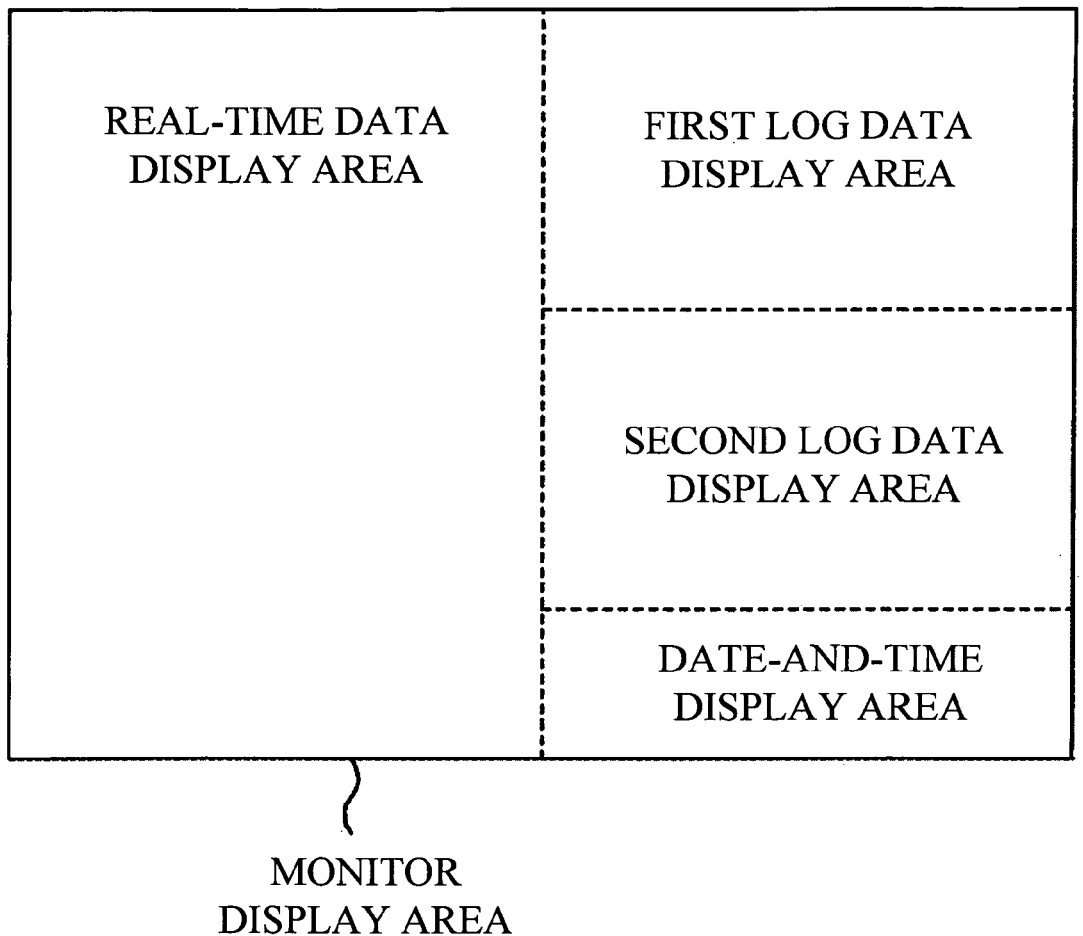
FIG. 13 is a block diagram showing the construction of the monitor display area.

FIG. 13 is a block diagram showing the construction of the monitor display area.

As shown in FIG. 13, the monitor display area includes a real-time data display area that displays serial data received in real-time from the computer 1, a first log data display area and a second log data display area that display the serial data stored into the terminal emulator 2 as the log data, and a date-and-time display area.

The log data stored for a time period from present to one week ago into the memory 206 is displayed on the first log data display area, and The log data stored before the time period into the memory 206 is displayed on the second log data display area. The user can set conditions of the log data displayed on the first log data display area and the second log data display area to the main controlling unit 202 via the keyboard 3 (a second setting portion). For example, display conditions may be set so that the log data stored into the memory 206 today is displayed on the first log data display area, and the log data stored into the memory 206 by the previous day is displayed on the second log data display area.

Date and time acquired from the real-time clock 207 by the main controlling unit 202 is displayed on the date-and-time display area.

It should be noted that the number and the positions of real-time data display areas and log data display areas arranged in the monitor display area on one screen are set by the main controlling unit 202, based on input from the keyboard 3.

In the monitor display area in FIG. 13, it is capable of causing the user to refer to the real-time data and a plurality of pieces of log data at the same time. Specifically, when the plurality of pieces of log data which are important for the user are distributed, the user can refer to the plurality of pieces of log data at the same time.

Figure 14:
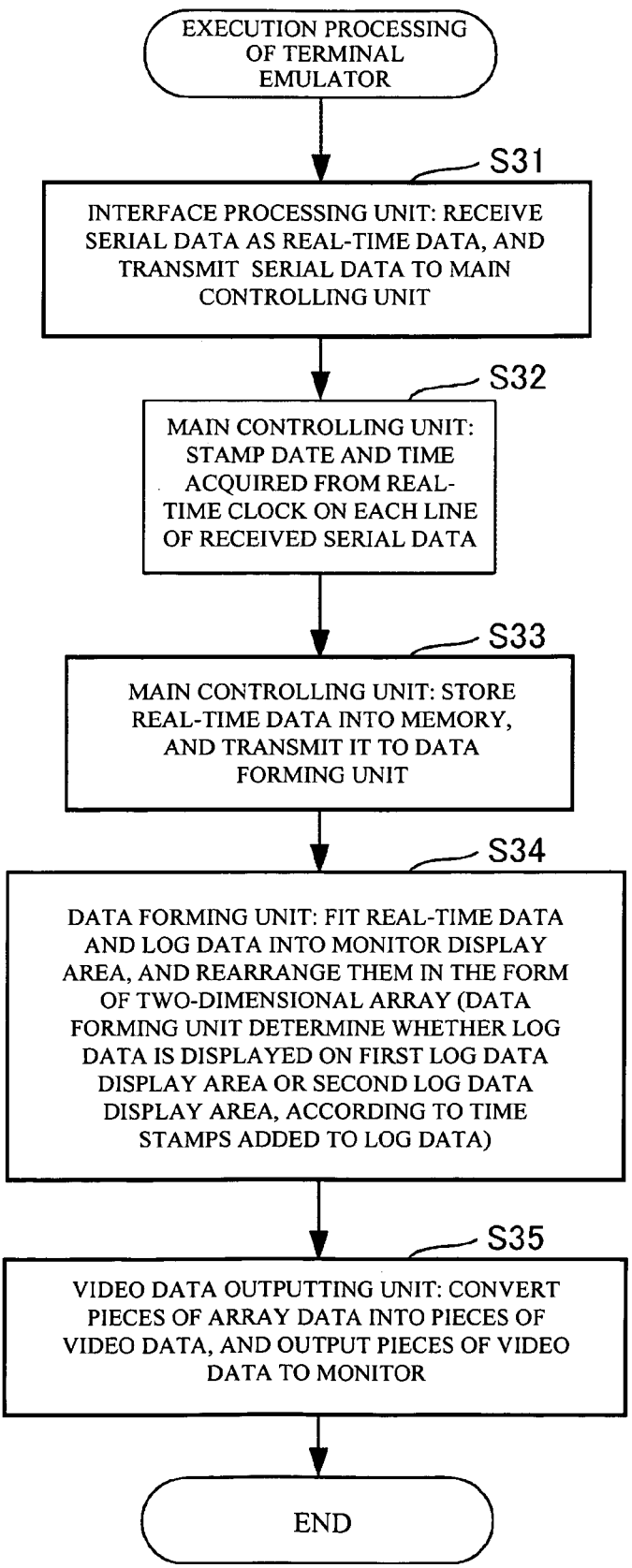
FIG. 14 is a flowchart showing execution processing of the terminal emulator 2 from the reception of the serial data to the generation of the video data.

FIG. 14 is a flowchart showing execution processing of the terminal emulator 2 from the reception of the serial data to the generation of the video data.

First, the interface processing unit 201 receives the serial data as the real-time data from the computer 1, and transmits the serial data to the main controlling unit 202 (step S31).

The main controlling unit 202 stamps date and time acquired from the real-time clock 207 on each line of the received serial data (step S32). Further, the main controlling unit 202 stores the received serial data into the memory 206, and transmits the received serial data to the data forming unit 203 (step S33).

The data forming unit 203 causes the serial data (i.e., real-time data) received from the main controlling unit 202 and the log data in the memory 206 to fit into the monitor display area, and rearranges the serial data and the log data in the form of the two-dimensional array, i.e., forms the plurality of pieces of array data (step S34). In this time, the data forming unit 203 determines whether the log data in the memory 206 is displayed on the first log data display area or the second log data display area, according to time stamps added to the log data.

The video data outputting unit 204 converts the plurality of pieces of array data formed by the data forming unit 203 into the plurality of pieces of video data at constant time intervals, and outputs the plurality of pieces of video data to the monitor 4 (step S35). The procedure is terminated.

Figure 15:
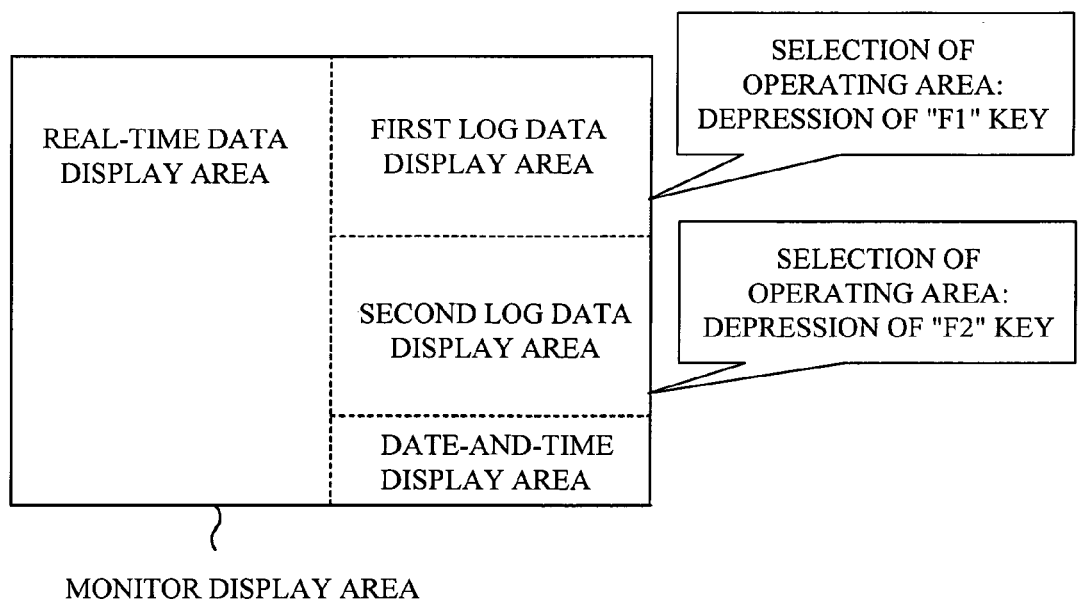
FIG. 15 is a diagram showing a method to select a first log data display area or a second log data display area in the case where log data in the first log data display area or the second log data display area is confirmed.

FIG. 15 is a diagram showing a method to select the first log data display area or the second log data display area in the case where log data in the first log data display area or the second log data display area is confirmed.

For example, when the user depresses an "F1" key of the keyboard 3, the first log data display area can be selected, and when the user depresses an "F2" key of the keyboard 3, the second log data display area can be selected. When the user depresses the "↑" key or the "↓" key in the state where the first log data display area or the second log data display area is selected, the displayed lines is scrolled and the log data can be displayed.

Figure 16:
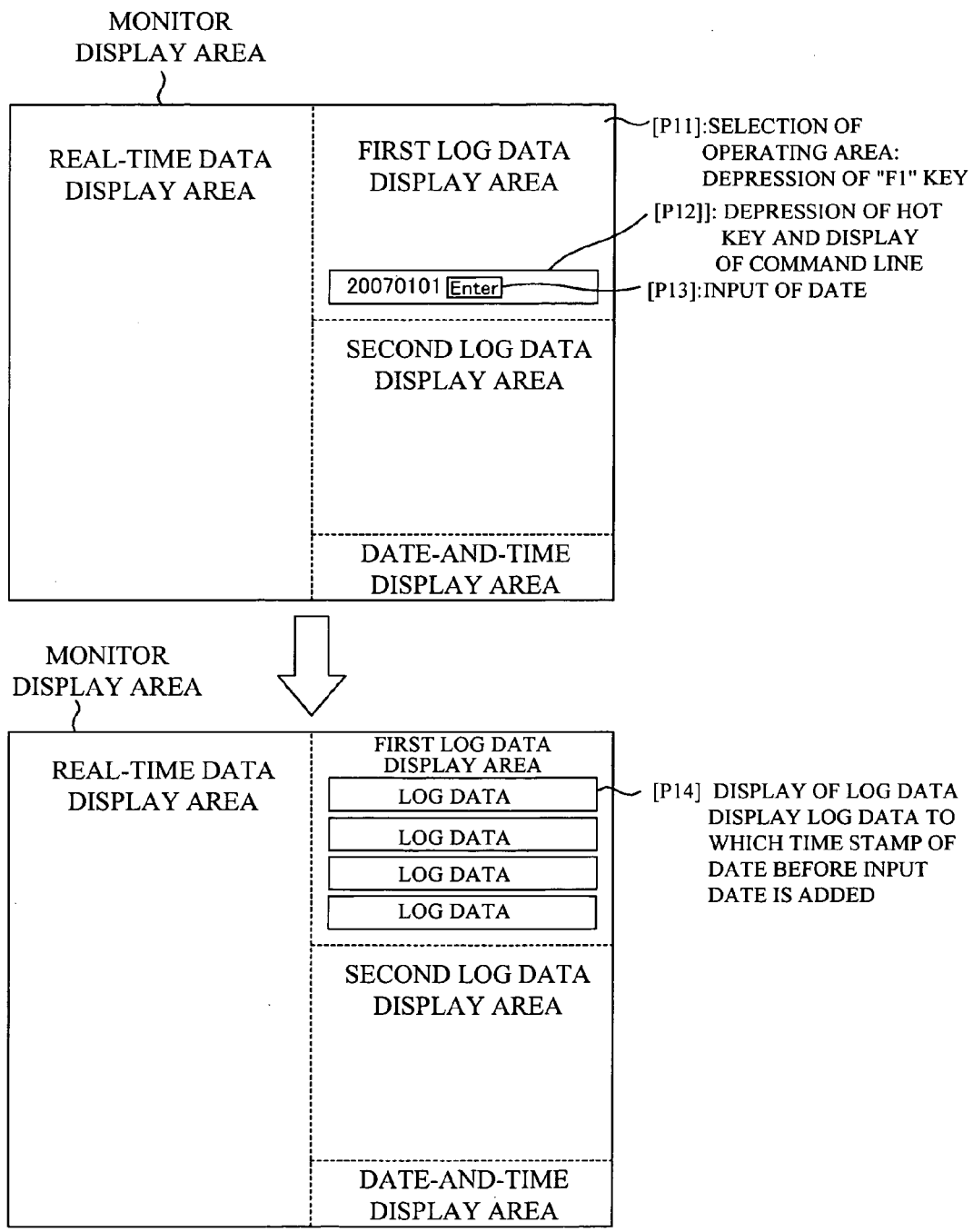
FIG. 16 is a diagram showing a method for displaying the log data stored into a memory 206 on the first log data display area.

FIG. 16 is a diagram showing a method for displaying the log data stored into the memory 206 on the first log data display area.

First, the user depresses the "F1" key of the keyboard 3 as described above to select the first log data display area (P11). Next, the user inputs any preset hot key, so that a command line is displayed on the first log data display area (P12). The user inputs a date to the command line with the keyboard 3, and depresses an "enter" key (P13). Then, the log data in the memory 206 to which the time stamp of a date before the input date is added is displayed on the first log data display area (P14).

As described in detail above, according to the first embodiment of the present invention, the memory 206 stores the real-time data received from the computer 1 as log data, the main controlling unit 202 sets at least one real-time data display area and the plurality of log data display areas arranged in the display screen of the monitor 4, the data forming unit 203 fits the real-time data and the plurality of pieces of log data into the set real-time data display area and the plurality of set log data display areas, and rearranges both of the real-time data and the plurality of pieces of log data in the form of the two-dimensional array, and the video data outputting unit 204 converts the rearranged real-time data and the plurality of pieces of rearranged log data into the plurality of pieces of video data, respectively, and outputs the plurality of pieces of converted video data to the monitor 4. Therefore, it is capable of causing the user to refer to the real-time data and the plurality of pieces of log data at the same time. Specifically, when the plurality of pieces of log data which are important for the user are distributed, the user can refer to the plurality of pieces of log data at the same time.

since the log data display area on which each of the plurality of pieces of log data is displayed is decided by the date and time added to the log data, the user becomes easy to reach and confirm desired log data. Further, the user can display the real-time data received from the computer 1 in addition to the log data on the monitor 4, and confirm them.

(First Variation)

Figure 17:
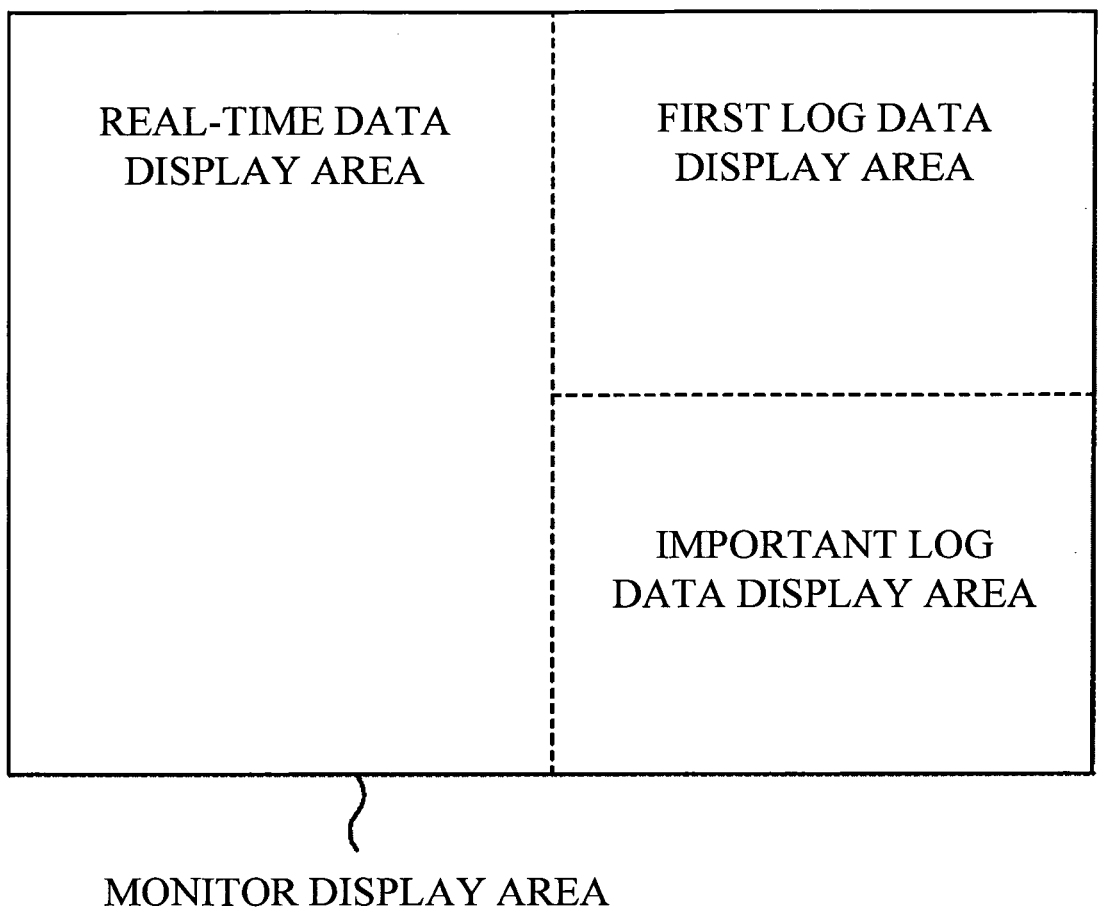
FIG. 17 is a block diagram showing the construction of the monitor display area.

FIG. 17 is a block diagram showing the construction of the monitor display area.

The monitor display area includes a real-time data display area that displays serial data received in real-time from the computer 1, a log data display area that displays the serial data stored into the terminal emulator 2 as the log data, and an important log data display area that displays only line including a preset character string with a high level of importance such as "error" and "fail", or several lines including lines before and behind the line including the preset character string.

A list including the character string with the high level of importance is stored into the memory 206, and is editable via the keyboard 3. The number and the positions of real-time data display areas, log data display areas, and important log data display areas arranged in the monitor display area on one screen are set by the main controlling unit 202, based on input from the keyboard 3.

The construction of the terminal emulator 2 is the same as that of the terminal emulator 2 in FIG. 1. However, the main controlling unit 202 searches whether the character string with the high level of importance (such as "error" and "fail") is included in the serial data received from the computer 1. When the character string with the high level of importance is included in the serial data, the main controlling unit 202 adds identification data to the line including the character string. Further, the main controlling unit 202 may adds identification data to the line including the character string, and lines before and behind the line including the character string. As a result, it is possible to correspond when the character string with the high level of importance extends over plural lines.

Figure 18:
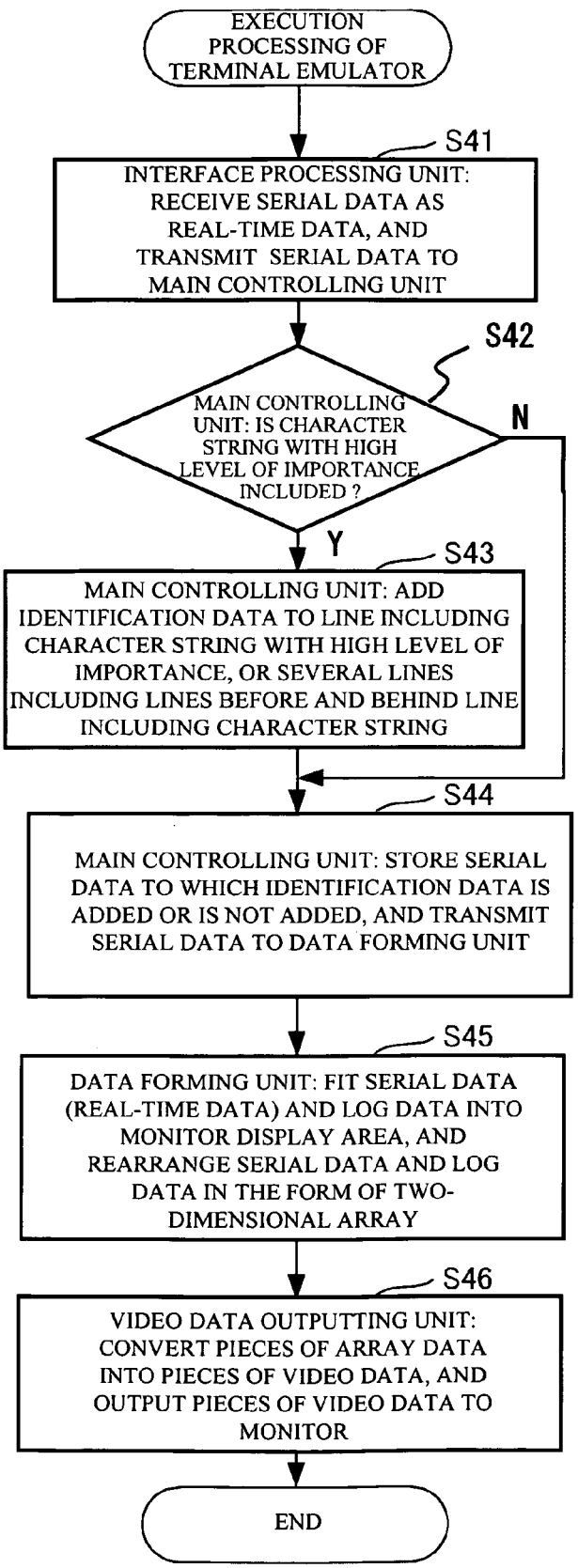
FIG. 18 is a flowchart showing execution processing of the terminal emulator 2 from the reception of the serial data to the generation of the video data.

FIG. 18 is a flowchart showing execution processing of the terminal emulator 2 from the reception of the serial data to the generation of the video data.

First, the interface processing unit 201 receives the serial data as the real-time data from the computer 1, and transmits the serial data to the main controlling unit 202 (step S41).

Next, the main controlling unit 202 determines whether the character string with the high level of importance is included in the received serial data (step S42). This procedure corresponds to a determining portion.

When the answer to the determination of step S42 is "YES", the main controlling unit 202 adds the identification data to the line including the character string with the high level of importance, or several lines including lines before and behind the line including the character string (step S43). This procedure corresponds to an identification data adding portion. Further, the main controlling unit 202 stores the serial data to which the identification data is added or is not added into the memory 206, and transmits the serial data to the data forming unit 203 (step S44). When the answer to the determination of step S42 is "NO", the procedure proceeds to step S44.

The data forming unit 203 fits the serial data (real-time data) received from the main controlling unit 202 and the log data in the memory 206 into the monitor display area, and rearranges the serial data and the log data in the form of the two-dimensional array, i.e., forms the plurality of pieces of array data (step S45).

The video data outputting unit 204 converts the plurality of pieces of array data formed by the data forming unit 203 into the plurality of pieces of video data at constant time intervals, and outputs the plurality of pieces of video data to the monitor 4 (step S46). The procedure is terminated.

As described above, according to the first variation, the log data with the high level of importance from all log data is automatically displayed, so that it becomes easy to confirm the log data with the high level of importance. The user can display the real-time data received from the computer 1 in addition to the log data on the monitor 4, and confirm them.

When the main controlling unit 202 adds the identification data to data line of the log data including the character string with the high level of importance, and data lines before and behind the data line including the character string, it becomes easy to confirm the log data with the high level of importance even when the character string with the high level of importance extends over plural lines.

(Second Embodiment)

A second embodiment is different from the first embodiment in that a plurality of computers are connected to the terminal emulator 2.

Figure 19:
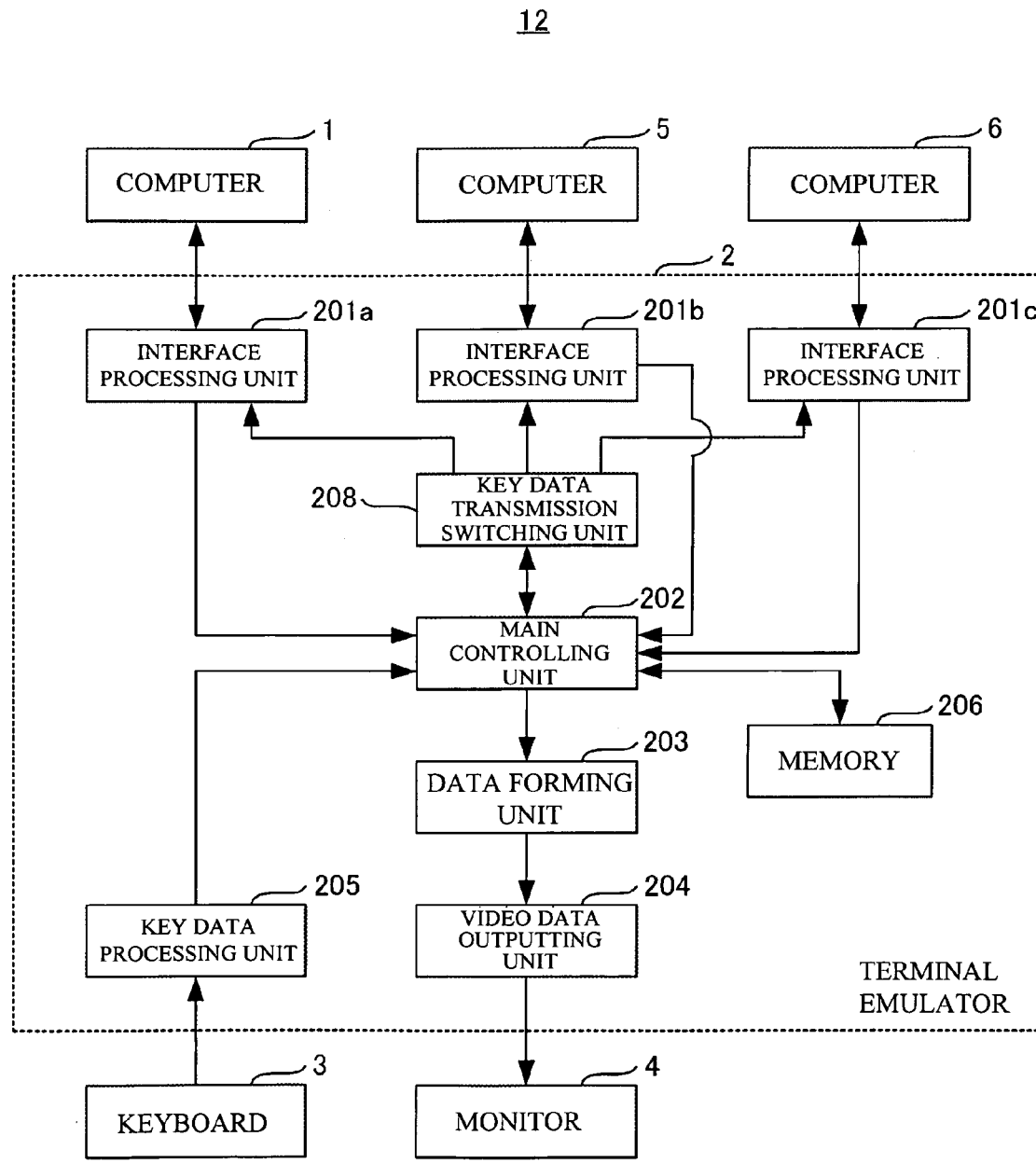
FIG. 19 is a block diagram showing the construction of a data processing system according to a second embodiment of the present invention.

FIG. 19 is a block diagram showing the construction of a data processing system according to the second embodiment of the present invention.

In FIG. 19, a data processing system 12 is provided with computers 1, 5, and 6, the terminal emulator 2, a keyboard 3, and a monitor 4 which is composed of a liquid crystal or a CRT. The terminal emulator 2 is connected to the computers 1, 5, and 6, the keyboard 3, and the monitor 4. The computers 1, 5, and 6 have mutually the same hardware construction.

Figure 20:
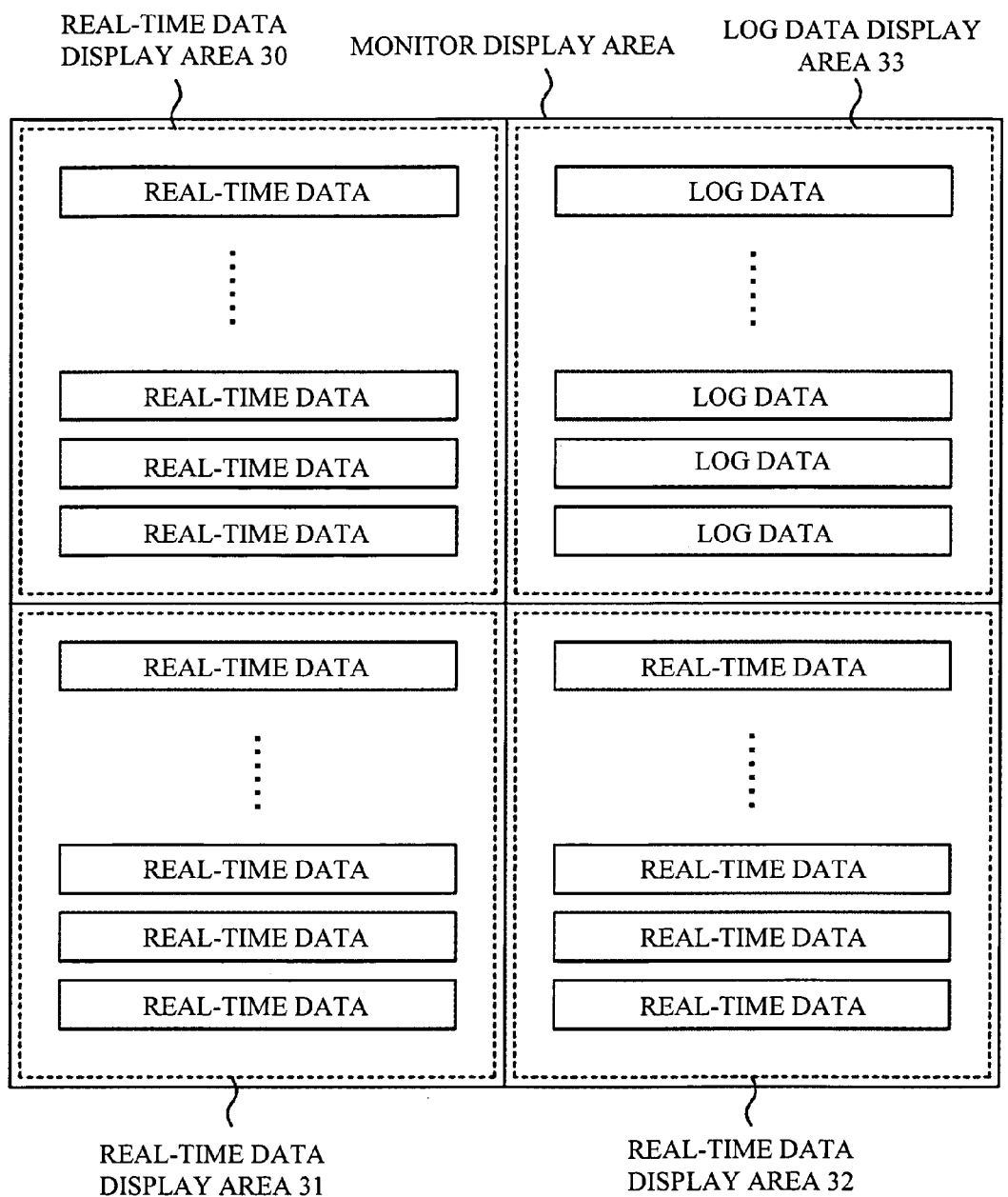
FIG. 20 is a block diagram showing the construction of the monitor display area.

As shown in FIG. 20, a display area of the monitor 4 (hereafter referred to as "a monitor display area") includes real-time data display areas 30 to 32 that display serial data received in real-time from each of the computers 1, 5, and 6 by the terminal emulator 2, and a log data display area 33 that displays serial data stored into the terminal emulator 2 as log data. The log data display area 33 displays the log data of a computer selected from the computers 1, 5, and 6.

Thus, in the second embodiment, a plurality of pieces of real-time data and the log data of the selected computer are displayed on the same screen.

Interface processing units 201a to 201c (connecting portions) receive the plurality of pieces of serial data from the computers 1, 5, and 6, respectively, and transmit the plurality of pieces of received serial data to the main controlling unit 202. The interface processing units 201a to 201c transmit key data received from a key data transmission switching unit 208 to the computers 1, 5, and 6, respectively.

The key data transmission switching unit 208 transmits the key data received from the main controlling unit 202 to any of the interface processing units 201a to 201c. The switch of the computers 1, 5, and 6 which are destinations of key data is executed according to instruction data from the main controlling unit 202.

The main controlling unit 202 adds the data ID as shown in FIG. 7 to the serial data received from each of the interface processing units 201a to 201c, and stores the serial data to which the data ID is added into the memory 206. Then, the main controlling unit 202 transmits the serial data to which the data ID is added to the data forming unit 203.

When any of the real-time data display areas 30 to 32 is in an active state, the main controlling unit 202 transmits the key data received from the key data processing unit 205 to the key data transmission switching unit 208.

When the main controlling unit 202 receives information of a preset hot key from the key data processing unit 205, the main controlling unit 202 switches the states of the real-time data display area and the log data display area. Further, when the log data display area is in the active state, and the main controlling unit 202 receives the key data indicative of depression of the "↑" key or the "↓" key from the key data processing unit 205, the main controlling unit 202 transmits instruction data to scroll operation to the data forming unit 203. When the main controlling unit 202 receives information indicative of the preset hot key from the key data processing unit 205, the main controlling unit 202 transmits instruction data for changing an arrow setting (up and down, or right and left) formed by the data forming unit 203 to the data forming unit 203.

The main controlling unit 202 sets the number and the positions of real-time data display areas and log data display areas arranged in the monitor display area on one screen, based on input from the keyboard 3. The main controlling unit 202 transmits instruction data for instructing the switch of destination of the key data to the key data transmission switching unit 208 according to the active state of the monitor display area.

The data forming unit 203 (data forming portion) rearranges the serial data received from the main controlling unit 202 in the form of the two-dimensional array such that the serial data fits into the monitor display area. The data forming unit 203 determines the display position of the serial data (i.e., the real-time data or the log data) based on the data ID which is added to the serial data by the main controlling unit 202.

The data forming unit 203 receives the instruction data from the main controlling unit 202, acquires the serial data (log data) corresponding to scroll operation from the memory 206, and forms the array data.

The video data outputting unit 204 (outputting portion) converts the array data formed by the data forming unit 203 into video data at constant time intervals, and outputs the video data. The key data processing unit 205 transmits the key data input from the keyboard 3 to the main controlling unit 202. The memory 206 receives and stores the serial data (real-time data) from the main controlling unit 202.

Figure 21:
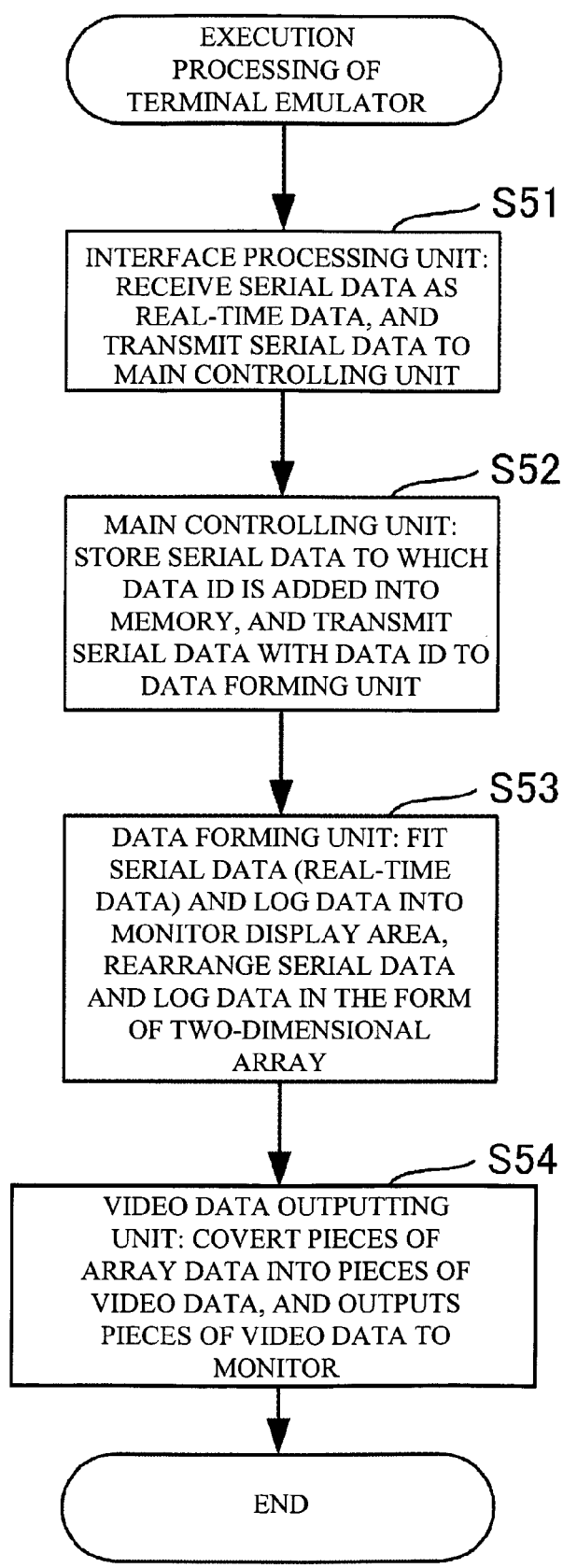
FIG. 21 is a flowchart showing execution processing of the terminal emulator 2 from the reception of the serial data to the generation of the video data.

FIG. 21 is a flowchart showing execution processing of the terminal emulator 2 from the reception of the serial data to the generation of the video data.

First, the interface processing unit 201a receives the serial data as the real-time data from the computer 1, and transmits the serial data to the main controlling unit 202 (step S51).

The main controlling unit 202 adds data ID (here, an ID indicative of reception from the computer 1) to the received serial data, stores the serial data to which the data ID is added into the memory, and transmits the serial data to the data forming unit 203 (step S52).

The data forming unit 203 fits the serial data (real-time data) received from the main controlling unit 202 and the log data in the memory 206 into the monitor display area, rearranges the serial data and the log data in the form of the two-dimensional array, i.e., forms a plurality of pieces of array data (step S53).

The video data outputting unit 204 coverts the plurality of pieces of array data formed by the data forming unit 203 into a plurality of pieces of video data, and outputs the plurality of pieces of video data to the monitor 4 (step S54). The procedure is terminated. The processing of the terminal emulator 2 when a plurality of pieces of serial data are received from the computers 5 and 6 is identical with the processing in FIG. 21, and a description thereof is omitted.

Figure 22:
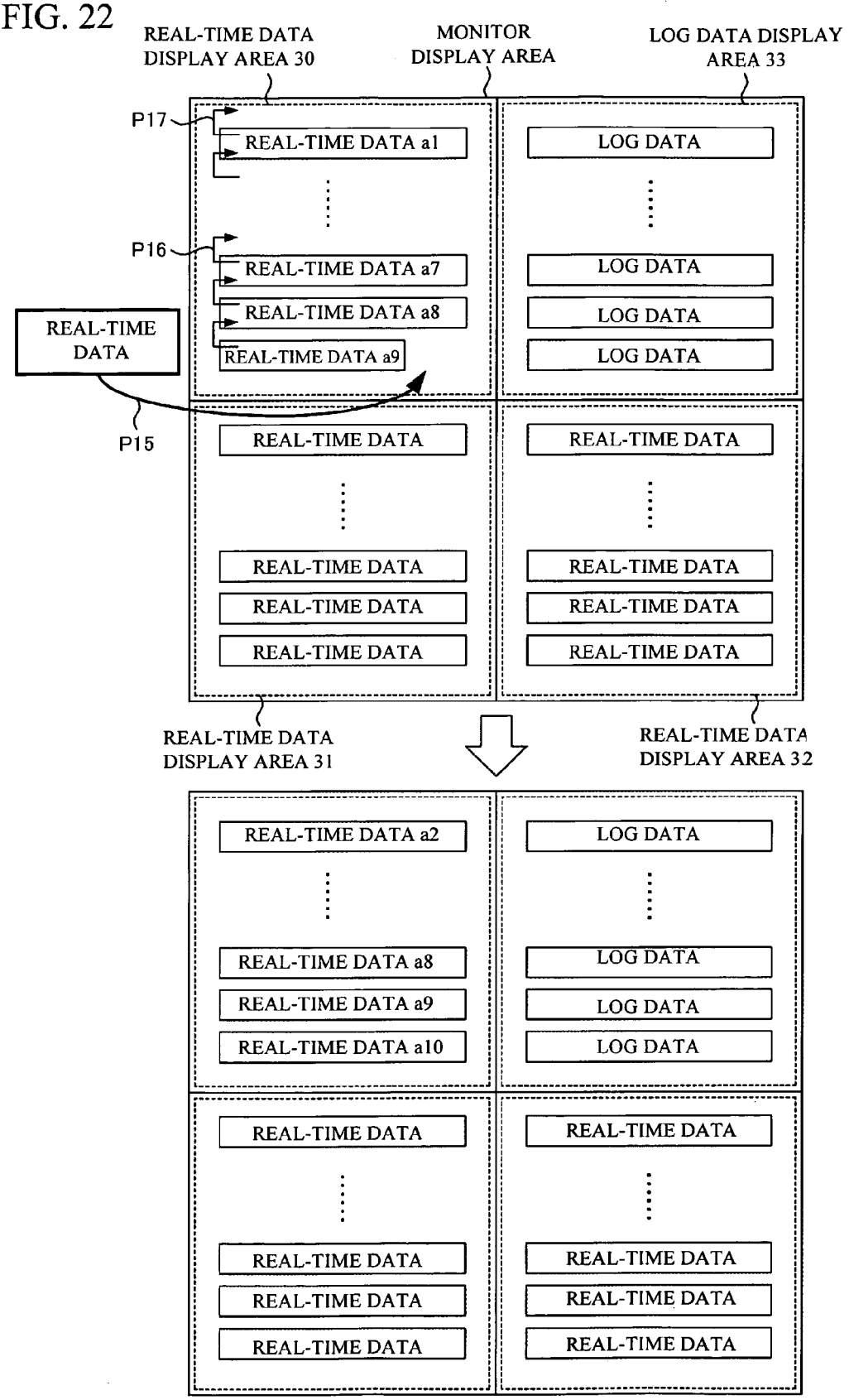
FIG. 22 is a diagram showing a method to form array data in a real-time data display area 30.

FIG. 22 is a diagram showing a method to form the array data in the real-time data display area 30.

The data forming unit 203 arranges the received serial data at an undermost line of the real-time data display area 30 (P15). It is determined to arrange the received serial data to the real-time data display area 30 based on the data ID. When the number of characters displayed on the undermost line exceeds a specified value, or a line feed code is received, the data forming unit 203 moves lines displayed on the real-time data display area upward by one line (P16). The data forming unit 203 deletes an uppermost line from the array data (P17). The data forming unit 203 updates displayed contents of the real-time data display area by repeating the procedures of the P15 to P17.

The main controlling unit 202 can switch any one of the real-time data display areas 30 to 32 or the log data display area 33 to a display area in a state where the key input from the keyboard 3 becomes effective (hereinafter referred to as "an active state").

With respect to the color and the style of displayed characters, when the main controlling unit 202 receives information of the hot key that makes any one of the display areas the active state, the main controlling unit 202 transmits the instruction data (see FIGS. 7A and 7B) to the data forming unit 203. The data forming unit 203 switches the color and the style of the displayed characters in the array data of one of the real-time data display areas or the log data display area, according to the data ID included in the instruction data.

Thus, the determination that which display area is the active state is possible by the change of the color or the style of the displayed characters (such as a change to a bold-face or a change of a font).

Figure 23:
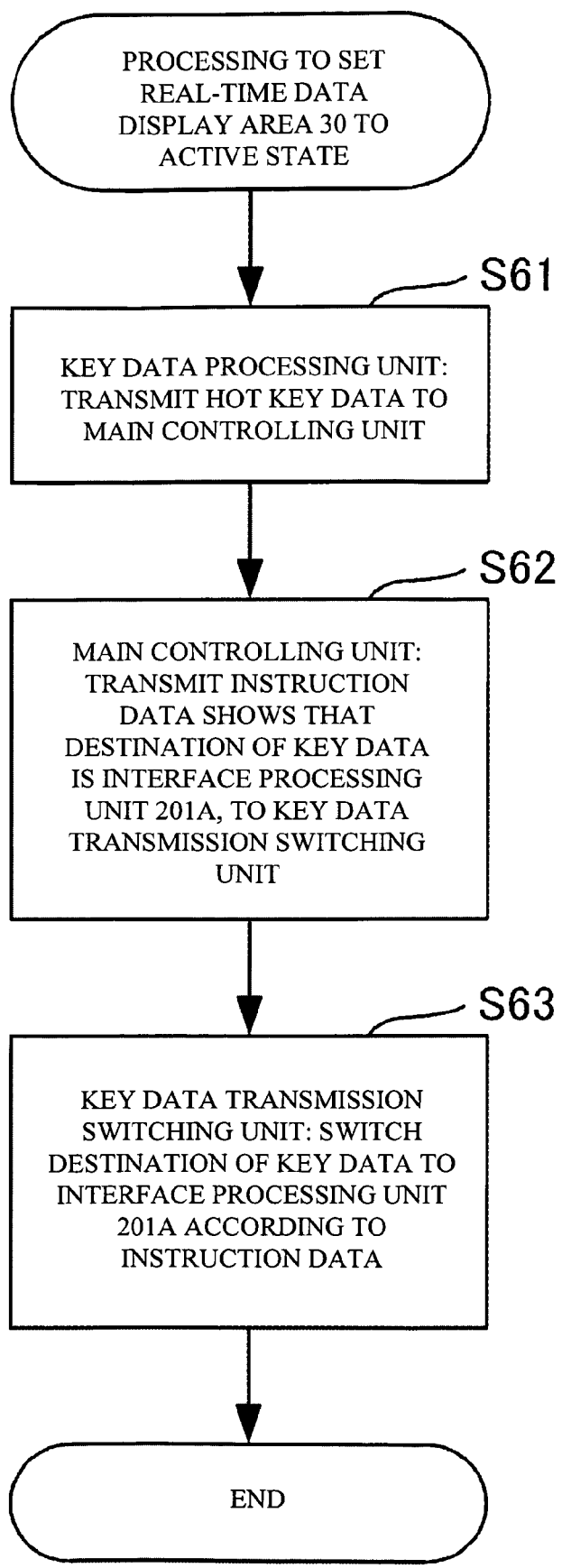
FIG. 23 is a flowchart showing processing to set the real-time data display area 30 to an active state by hot key input from a keyboard 3.

FIG. 23 is a flowchart showing processing to set the real-time data display area 30 to the active state by the hot key input from the keyboard 3.

First, the key data processing unit 205 transmits the hot key data received from the keyboard 3 to the main controlling unit 202 (step S61). The main controlling unit 202 transmits instruction data shows that the destination of the key data when the main controlling unit 202 receives the key data is the interface processing unit 201a, to the key data transmission switching unit 208 (step S62). The key data transmission switching unit 208 switches the destination of the key data to the interface processing unit 201a according to the received instruction data (step S63). The procedure is terminated.

Figure 24:
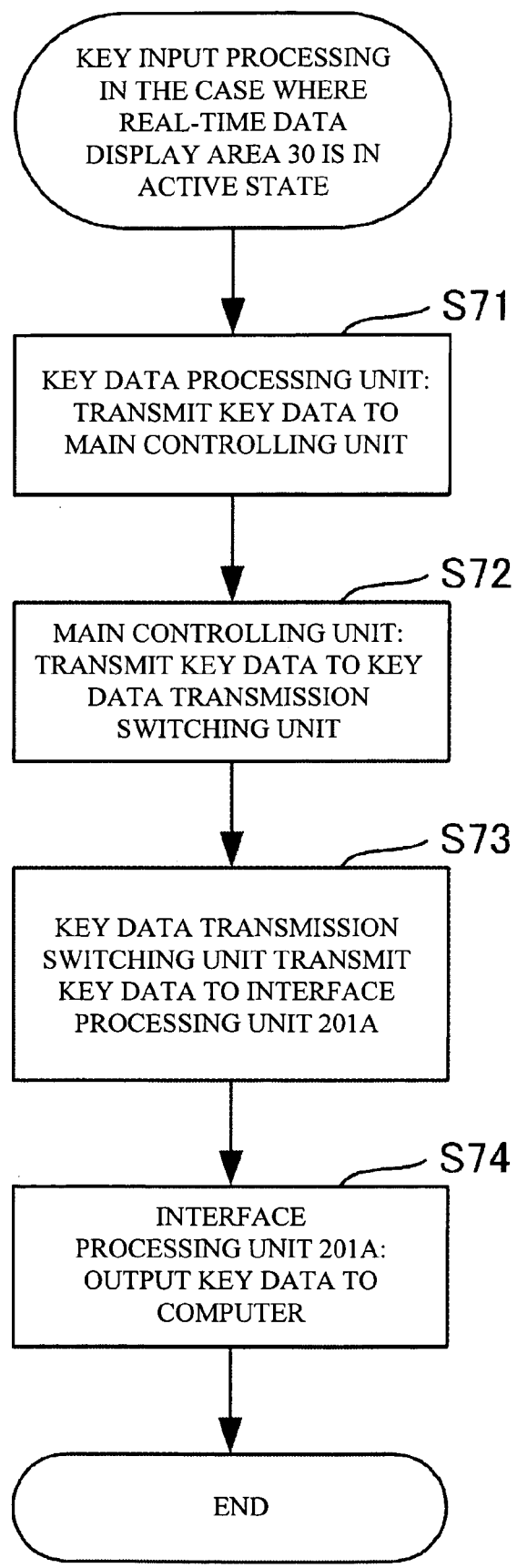
FIG. 24 is a flowchart showing key input processing in the case where the real-time data display area 30 is in the active state.

FIG. 24 is a flowchart showing key input processing in the case where the real-time data display area 30 is in the active state.

When the real-time data display area 30 is in the active state, the key input from the keyboard 3 becomes effective for the computer 1.

The key data processing unit 205 of the terminal emulator 2 transmits the key data received from the keyboard 3 to the main controlling unit 202 (step S71). The main controlling unit 202 transmits the received key data to the key data transmission switching unit 208 (step S72).

The key data transmission switching unit 208 transmits the received key data to the interface processing unit 201a (step S73). The interface processing unit 201a outputs the received key data to the computer 1 (step S74). The procedure is terminated.

With regard to the log data, the log data output from selected one of the computers 1, 5, and 6 is displayed. The computer outputting the log data is selected by the detection of the hot key from the keyboard 3 by the main controlling unit 202 (an selecting portion). The main controlling unit 202 distinguishes the log data stored in the memory 206 according to the data ID, and then the log data of the selected computer is transmitted to the data forming unit 203. The data forming unit 203 fits the log data into the log data display area 33, and rearranges the log data in the form of the two-dimensional array, i.e., forms the array data.

When the log data display area 33 is in the active state, the displayed lines is scrolled by depressing the "↑" key or the "↓" key, and hence the log data can be displayed.

Key input processing in the case where the log data display area 33 is in the active state is the same as the above-mentioned key input processing in FIG. 9. A method to form the array data when the log data display area 33 is in the active state and the "↑" key or the "↓" key is depressed is the same as the above-mentioned processing in FIG. 10 or FIG. 11.

As described in detail above, according to the second embodiment of the present invention, the memory 206 stores the plurality of pieces of real-time data received from the computers 1, 5, and 5 as the plurality of pieces of log data, the main controlling unit 202 selects the log data displayed on the log data display area of the display screen of the monitor 4 from the plurality of pieces of real-time data, the data forming unit 203 fits the plurality of pieces of real-time data and the selected log data into the real-time data display areas and the log data display area, and rearranges both of the plurality of pieces of real-time data and the selected log data in the form of the two-dimensional array, and the video data outputting unit 204 converts the plurality of pieces of rearranged real-time data and the rearranged log data into the plurality of pieces of video data, respectively, and outputs the plurality of pieces of converted video data to the monitor 4. Therefore, it is capable of causing the user to refer to the plurality of pieces of real-time data and the selected log data at the same time.

Figure 25:
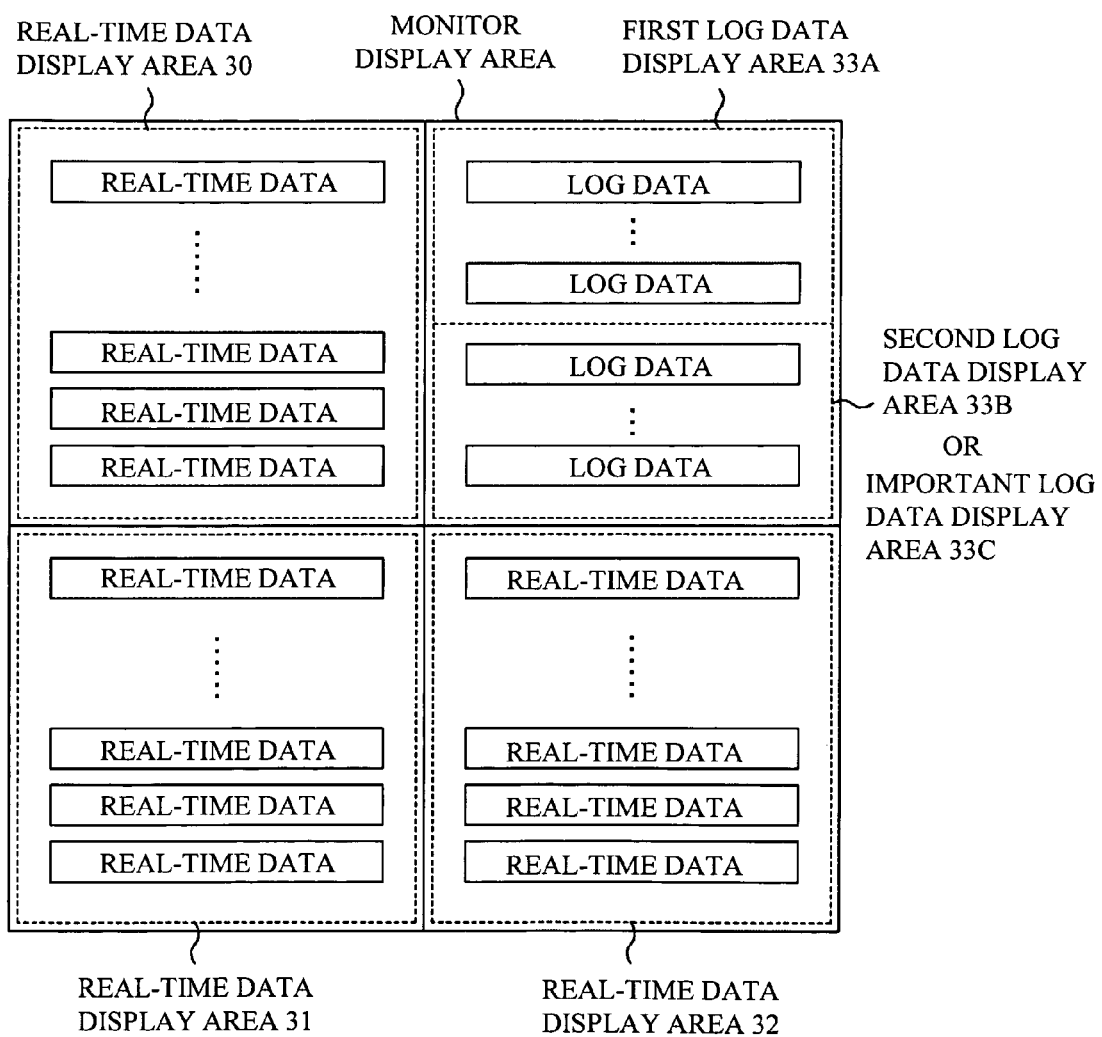
FIG. 25 is a block diagram showing a variation of the construction of the monitor display area.

Although in the second embodiment, the monitor display area includes the real-time data display areas 30 to 32 and the log data display area 33 as shown in FIG. 20, the log data display area 33 may be divided into a first log data display area 33a and a second log data display area 33b, or into the first log data display area 33a and an important log data display area 33c, as shown in FIG. 25. That is, the above-mentioned first embodiment (see FIG. 13) and the above-mentioned first variation (see FIG. 17) may be applied to the second embodiment.

When the log data display area 33 is divided into the first log data display area 33a and the second log data display area 33b, the main controlling unit 202 may cause the log data of the computer 1 to be displayed on the first log data display area 33a, and cause display the log data of the computer 5 to be displayed on the second log data display area 33b. The log data display area 33 is divided into three log data display areas, and the main controlling unit 202 may cause the pieces of the log data from the computers 1, 5, and 6 to be displayed on the divided three log data display areas. In this case, the main controlling unit 202 (a dividing portion) sets the divisional number of log data display areas based on the key input from the keyboard 3.

Thus, by dividing the log data display area 33, it is capable of causing the user to refer to the plurality of pieces of log data and the plurality of pieces of real-time data at the same time. When the plurality of pieces of log data which are stored into an information processing apparatus and are important for the user are distributed, the user can refer to the plurality of pieces of log data at the same time. Further, the user can refer to the plurality of pieces of log data stored into information processing apparatuses.

In the above-mentioned first and second embodiments, a USB port (a second connecting portion) for connecting an external storage may be further provided in the terminal emulator 2. The external storage is connected to the main controlling unit 202 via the USB port, and stores the serial data from the computer(s) as log data. Therefore, it is possible to store and carry high-capacity log data, and to confirm log data which exceeds the capacity of the memory 206.

In this case, the main controlling unit 202 (corresponding to a third switching portion in claim 10, and a second switching portion in claim 10) switches the destination of the serial data from the computer(s) to the memory 206 or the external storage depending on the hot key input from the keyboard 3. Therefore, it is possible to switch the destination of the log data depending on a user's demand.

The main controlling unit 202 of the second embodiment corresponds to a setting portion in claim 13. The main controlling unit 202 and the key data transmission switching unit 208 of the second embodiment correspond to a first switching portion in claim 16. The elements included in each claim are denoted in the above-mentioned description with parentheses.

A recording medium on which the software program for realizing the functions of the terminal emulator 2 is recorded may be supplied to the terminal emulator 2, and the CPU 21 may read and execute the program recorded on the recording medium. In this manner, the same effects as those of the above-described first and second embodiments can be achieved. The recording medium for providing the program may be a CD-ROM, a DVD, or a SD card, for example.

Alternatively, the terminal emulator 2 may execute a software program for realizing the functions of the terminal emulator 2, so as to achieve the same effects as those of the above-described first and second embodiments.

It should be noted that the present invention is not limited to those embodiments, and various modifications may be made to them without departing from the scope of the invention.

The present application is based on Japanese Patent Application No. 2007-196752 filed Jul. 27, 2007, the entire disclosure of which is hereby incorporated by reference.

What is claimed is:

1. A terminal emulator comprising:
a connecting portion that is connectable between an information processing apparatus and a display device;
a storing portion that stores real-time data received from the information processing apparatus as log data;
a first setting portion that sets at least one real-time data display area displaying real-time data, and a plurality of log data display areas displaying a plurality of pieces of log data, the at least one real-time data display area and the plurality of log data display areas being arranged on a display screen of the display device, the plurality of log data display areas includes at least one important log data display area which displays real-time data includes a preset character string as the log data;

a data forming portion that fits the real-time data and the plurality of pieces of log data into the at least one real-time data display area and the plurality of log data display areas set by the first setting portion, respectively, and rearranges each of the real-time data and the plurality of pieces of log data in the form of a two-dimensional array; and an outputting portion that converts the rearranged real-time data and the plurality of pieces of rearranged log data into a plurality of pieces of video data, respectively, and outputs the plurality of pieces of video data to the display device.

2. The terminal emulator as claimed in claim 1, comprising a date-and-time adding portion that adds a date and a time to the real-time data which is stored into the storing portion as the log data, and a second setting portion that sets which of the plurality of log data display areas the log data is displayed on, based on the date and the time added to the log data.

3. The terminal emulator as claimed in claim 1, wherein the storing portion has a list in which any character string included in the real-time data is preset, and wherein the first setting portion sets a first log data display area and an important log data display area as the plurality of log data display areas, the terminal emulator comprises a determining portion that determines whether any character string set in the list is included in real-time data received from the information processing apparatus, and an identification data adding portion that adds identification data to a data line of the real-time data including the any character string when it is determined that the any character string is included in the real-time data, and the storing portion stores the real-time data to which the identification data is added, as the log data.

4. The terminal emulator as claimed in claim 3, wherein the identification data adding portion adds the identification data to the data line of the real-time data including the any character string and data lines before and behind the data line.

5. The terminal emulator as claimed in claim 1, wherein the connecting portion connects an inputting device that executes data input to any one of the real-time data display area and the plurality of log data display areas thereto, and the terminal emulator comprises a first switching portion that switches any one of the real-time data display area and the plurality of log data display areas to be a display area of an active state where data input from the inputting device becomes effective, based on given data input from the inputting device.

6. The terminal emulator as claimed in claim 5, wherein a color and a style of displayed characters in the display area of the active state are switched from a color and a style of the displayed characters in the display area of a nonactive state.

7. The terminal emulator as claimed in claim 1, wherein the real-time data display area and the plurality of log data display areas are displayed so as to divide the display screen of the display device into an up side and a down side or a right side and a left side, respectively.

8. The terminal emulator as claimed in claim 7, comprising a second switching portion that switches a divisional type of the real-time data display area and the plurality of log data display areas.

9. The terminal emulator as claimed in claim 1, comprising a second connecting portion that connects an external storage thereto, wherein the log data is stored into the external storage.

10. The terminal emulator as claimed in claim 9, comprising a third switching portion that switches a destination of storing of the log data to any one of the storing portion and the external storage.

11. A terminal emulator comprising:
a connecting portion that is connectable between a plurality of information processing apparatuses and a display device;
a storing portion that stores a plurality of pieces of real-time data received from the plurality of information processing apparatuses as a plurality of pieces of log data;
a selecting portion that selects log data displayed on a log data display area in a display screen of the display device from the plurality of pieces of log data;
a data forming portion that fits the plurality of pieces of real-time data and the selected log data into a plurality of real-time data display areas and the log data display area, respectively, and rearranges each of the plurality of pieces of the real-time data and the log data in the form of a two-dimensional array, the plurality of real-time data display areas and the log data display area being displayed on a display screen of the display device; and
an outputting portion that converts the plurality of pieces of rearranged real-time data and the rearranged log data into a plurality of pieces of video data, respectively, and outputs the plurality of pieces of video data to the display device.

12. The terminal emulator as claimed in claim 11, further comprising a dividing portion that divides the log data display area into a plurality of data display areas.

13. The terminal emulator as claimed in claim 12, further comprising a date-and-time adding portion that adds date and time to the plurality of pieces of real-time data which are stored into the storing portion as the plurality of pieces of log data, and a setting portion that sets which of the plurality of divided data display areas each of the plurality of pieces of log data is displayed on, based on the date and time added to each of the plurality of pieces of log data.

14. The terminal emulator as claimed in claim 12, wherein the storing portion has a list in which any character string included in the plurality of pieces of real-time data is preset,
the dividing portion divides the log data display area into a first log data display area and an important log data display area,
the terminal emulator further comprises a determining portion that determines whether the any character string set in the list is included in real-time data received from each of the information processing apparatuses, and an identification data adding portion that adds identification data to a data line of the real-time data including the any character string when it is determined that the any character string is included in the real-time data,
the storing portion stores the real-time data to which the identification data is added, as the log data, and
the log data is displayed on the important log data display area.

15. The terminal emulator as claimed in claim 14, wherein the identification data adding portion adds the identification data to the data line of the real-time data including the any character string and data lines before and behind the data line.

16. The terminal emulator as claimed in claim 11, wherein the connecting portion connects an inputting device that executes data input to any one of the plurality of real-time data display areas and the log data display area thereto, and the terminal emulator further comprises a first switching portion that switches any one of the plurality of real-time data display areas and the log data display area to be a display area of an active state where data input from the inputting device becomes effective, based on given data input from the inputting device.

17. The terminal emulator as claimed in claim 16, wherein the color and the style of displayed characters in the display area of the active state are switched from the color and the style of the displayed characters in the display area of a nonactive state.

18. The terminal emulator as claimed in claim 11, further comprising a second connecting portion that connects an external storage thereto, wherein the plurality of pieces of log data are stored into the external storage.

19. The terminal emulator as claimed in claim 18, further comprising a second switching portion that switches a destination of storing of the plurality of pieces of log data to any one of the storing portion and the external storage.

20. A controlling method for a terminal emulator which is connected between an information processing apparatus and a display device, comprising:
- storing real-time data received from the information processing apparatus as log data into a memory;
- fitting real-time data and log data into a real-time data display area and a log data display areas, respectively, and rearranging each of the real-time data and the log data in the form of a two-dimensional array, the real-time data display area and the log data display area being displayed on a display screen of the display device;
- converting the rearranged real-time data and the rearranged log data into a plurality of pieces of video data, respectively, and outputting the plurality of pieces of video data to the display device; and
- setting the number and the position of real-time data display areas and log data display areas arranged in the display screen of the display device, and
- wherein the setting sets the real-time data display area and a plurality of log data display areas, the plurality of log data display areas includes at least one important log data display area which displays real-time data including a preset character string as the log data.

21. A controlling method for a terminal emulator which is connected between a plurality of information processing apparatuses and a display device, comprising:
- a storing step of storing a plurality of pieces of real-time data received from the plurality of information processing apparatuses as a plurality of pieces of log data into a memory;
- a selecting step of selecting log data displayed on a log data display area in a display screen of the display device from the plurality of pieces of log data;
- a data forming step of fitting the plurality of pieces of real-time data and the selected log data into a plurality of real-time data display areas and the log data display area, respectively, and rearranging each of the plurality of pieces of the real-time data and the log data in the form of a two-dimensional array, the plurality of real-time data display areas and the log data display area being displayed on a display screen of the display device; and
- an outputting step of converting the plurality of pieces of rearranged real-time data and the rearranged log data into a plurality of pieces of video data, respectively, and outputting the plurality of pieces of video data to the display device.

* * * * *